US012309683B2

(12) United States Patent
Shirakata et al.

(10) Patent No.: US 12,309,683 B2
(45) Date of Patent: May 20, 2025

(54) WIRELESS COMMUNICATION SYSTEM, WIRELESS COMMUNICATION DEVICE, AND WIRELESS COMMUNICATION CONTROL METHOD

(71) Applicant: Panasonic Intellectual Property Management Co., Ltd., Osaka (JP)

(72) Inventors: Naganori Shirakata, Kanagawa (JP); Kazuma Nishiyasu, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 373 days.

(21) Appl. No.: 17/590,671

(22) Filed: Feb. 1, 2022

(65) Prior Publication Data

US 2022/0159546 A1   May 19, 2022

Related U.S. Application Data

(63) Continuation of application No. PCT/JP2020/027863, filed on Jul. 17, 2020.

(30) Foreign Application Priority Data

Aug. 6, 2019   (JP) .................................. 2019-144493

(51) Int. Cl.
*H04W 84/12* (2009.01)
*H04W 40/12* (2009.01)
*H04W 40/22* (2009.01)
*H04W 76/10* (2018.01)

(52) U.S. Cl.
CPC ........... *H04W 40/22* (2013.01); *H04W 40/12* (2013.01); *H04W 76/10* (2018.02)

(58) Field of Classification Search
None
See application file for complete search history.

(56) References Cited

U.S. PATENT DOCUMENTS

| 2015/0264628 A1 | 9/2015 | Wen et al. |
| 2017/0181053 A1 | 6/2017 | Aoun et al. |

FOREIGN PATENT DOCUMENTS

| JP | 2015-188207 A | 10/2015 | |
| JP | 2016-506198 A | 2/2016 | |
| JP | 2017-034467 A | 2/2017 | |
| JP | WO-2019116786 A1 * | 6/2019 | |
| JP | 2019124902 A * | 7/2019 | |
| JP | 2019125902 A * | 7/2019 | |
| WO | WO-2019116786 A1 * | 6/2019 | ............... G01S 5/14 |

OTHER PUBLICATIONS

International Search Report, mailed Oct. 13, 2020, for International Application No. PCT/JP2020/027863 (5 pages with English translation).

* cited by examiner

*Primary Examiner* — Gary Lafontant
(74) *Attorney, Agent, or Firm* — Seed IP Law Group LLP

(57) ABSTRACT

This wireless communication system comprises: a first wireless node; a second wireless node that transmits a signal to the first wireless node in response to a request from the first wireless node; and a third wireless node that transmits a connection request to the second wireless node in response to reception of the signal. The second wireless node transmits to the third wireless node connection permission for the connection request, and the first wireless node detects the third wireless node by receiving the connection permission.

4 Claims, 18 Drawing Sheets

WIRELESS COMMUNICATION SYSTEM, WIRELESS COMMUNICATION DEVICE, AND WIRELESS COMMUNICATION CONTROL METHOD

TECHNICAL FIELD

The present disclosure relates to a radio communication system, a radio communication apparatus, and a radio communication control method.

BACKGROUND ART

A network (e.g., a wireless mesh network) for forwarding a message between a plurality of nodes (or also called radio nodes, radio communication apparatuses, or radio communication terminals) is being used (see, for example, Patent Literature (hereinafter, referred to as "PTL") 1).

CITATION LIST

Patent Literature

PTL 1
Japanese Unexamined Patent Application Publication (Translation of PCT Application) No. 2016-506198

SUMMARY OF INVENTION

However, in networks such as wireless mesh networks, there is scope for further study on a method for determining nodes involved in multi-hop transmission based on inter-node radio link quality.

One non-limiting and exemplary embodiment facilitates providing a radio communication system, a radio communication apparatus, and a radio communication control method capable of efficiently determining a radio communication apparatus involved in signal transmission in a network including a plurality of radio communication apparatuses.

A radio communication system according to an exemplary embodiment of the present disclosure includes: a first radio node; one or more second radio nodes that are connected with the first radio node and that transmit a signal to the first radio node; and a third radio node that transmits a connection request to the one or more second radio nodes when receiving the signal addressed to the first radio node, in which, when the one or more second radio nodes receives the connection request, the one or more second radio nodes transmit connection permission to the third radio node, the connection permission indicating that the one or more second radio nodes function as a relay node between the first radio node and the third radio node.

It should be noted that general or specific embodiments may be implemented as a system, a method, an integrated circuit, a computer program, a storage medium, or any selective combination thereof.

According to an exemplary embodiment of the present disclosure, it is possible to efficiently determine a radio communication apparatus involved in signal transmission in a network including a plurality of radio communication apparatuses.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings. Note that, the embodiment described below is one example and the present disclosure is not limited by the below-described embodiment.

For example, in PTL 1, a radio node that forwards (in other words, relays) a signal (e.g., a message or a packet) in a wireless mesh network is determined based on a layout diagram illustrating a spatial arrangement. For example, a layout element (e.g., a road) included in the layout diagram and the radio node are associated with each other in advance, and forwarding the signal is controlled based on layout information such as a geographic distance and a traveling distance.

However, it is possible that the geographic positional relation and distance of the radio node do not match the link quality or propagation environment in the actual radio environment. For example, in environments, such as in factories, where a larger number of metals being more likely to cause blockage and reflection are present, or in environments where a larger number of mobile entities such as people and transporting robots are present, the link quality and propagation environment for each radio node are easily changed. Therefore, in cases where the layout element is associated with a radio node that relays a signal (hereinafter, also referred to as "relay node"), the link quality, for example, at the relay node may be low and the transmission efficiency may thus decrease.

One exemplary embodiment of the present disclosure will be described in relation to a method in which a node (in other words, a communication path) involved in signal transmission is dynamically determined based on link qualities between a plurality of radio nodes. For example, in multi-hop communication in a congested radio network with radio nodes, dynamic determination of the communication path based on the link qualities between the radio nodes allows efficient determination of the communication path (or optimization of the communication path). Efficient determination of the communication path can improve the transmission efficiency in the radio network.

Radio Network Configuration Example

Figure 1A:
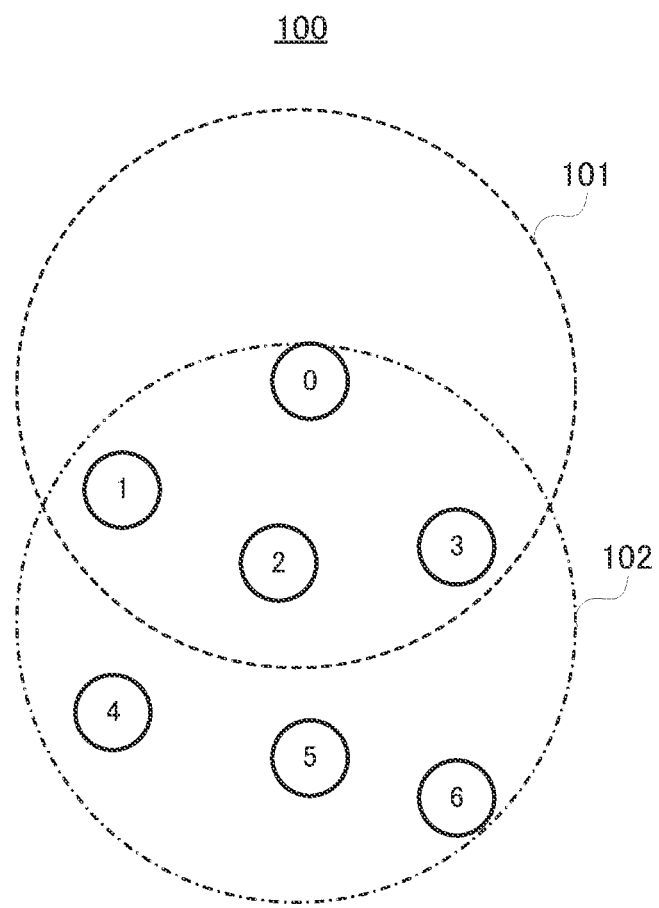
FIG. 1A illustrates an example of a radio network configuration.

FIG. 1A illustrates a configuration example of radio network (in other words, radio communication system) 100 according to an exemplary embodiment of the present disclosure.

FIG. 1A schematically illustrates the arrangement of radio nodes 0 to 6 constituting radio network 100. In FIG. 1A, for example, communication area 101 indicates the range in which it is possible for radio node 0 to communicate, and communication area 102 indicates the range in which it is possible for radio node 2 to communicate. Note that, in FIG. 1A, other radio nodes 1 and 3 to 6 similarly have respective communication areas that are ranges in which it is possible for the other radio nodes to communicate (not illustrated). Note that, the term "communication area" may be replaced with another term such as "coverage" or "service area."

For example, in FIG. 1A, communication area 101 of radio node 0 includes radio nodes 1, 2, and 3. Therefore, radio node 0 directly communicates with radio nodes 1, 2, and 3. Meanwhile, in FIG. 1A, communication area 101 of radio node 0 does not include radio nodes 4, 5, and 6. Therefore, radio node 0 does not directly communicate with radio nodes 4, 5, and 6.

Similarly, in FIG. 1A, communication area 102 of radio node 2 includes radio nodes 0, 1, and 3 to 6. Therefore, radio node 2 directly communicates with each of radio nodes 0, 1, and 3 to 6.

Figure 1B:
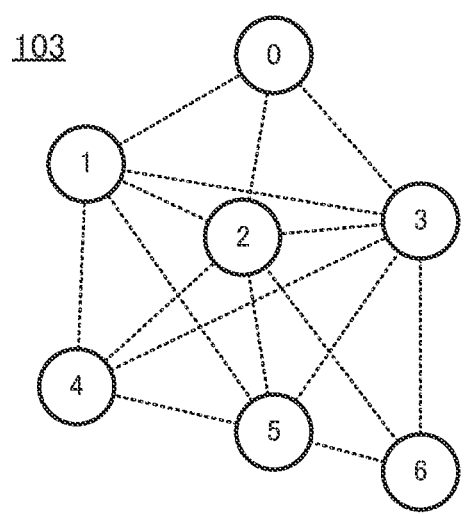
FIG. 1B illustrates an example of communication paths between radio nodes forming a radio network.

FIG. 1B illustrates exemplary communication paths 103 between radio nodes 0 to 6 included in radio network 100 according to an exemplary embodiment of the present disclosure. Communication paths 103 illustrated in FIG. 1B illustrate an example of communication paths in radio network 100 that are illustrated by dotted lines connecting between those of radio nodes 0 to 6 which directly communicate with one another.

By way of example, in communication paths 103, radio node 0 is connected by radio links with radio nodes 1, 2, and 3, and thus has communication paths that allow direct communication. On the other hand, radio node 0 is not connected by radio links with other radio nodes 4, 5, and 6, and does not have communication paths that allow direct communication. By way of another example, in communication paths 103, radio node 6 is connected with radio nodes 2, 3, and 5 by radio links, and thus has communication paths that allow direct communication. On the other hand, radio node 6 is not connected by radio links with other radio nodes 0, 1, and 4, and does not have communication paths that allow direct communication.

In one exemplary embodiment of the present disclosure, the radio nodes collect the qualities of the radio links (hereinafter, also abbreviated as "link qualities") between the radio nodes in radio network 100. The radio nodes also select a radio node (hereinafter also referred to as "relay node") that relays information or a signal including the collected link qualities. The term "relay" of the information or signal may be replaced with "forwarding" or "multi-hop communication" of the information or signal. In addition, selecting the radio node (for example, the relay node) may be regarded as selecting a communication path.

Figure 2:
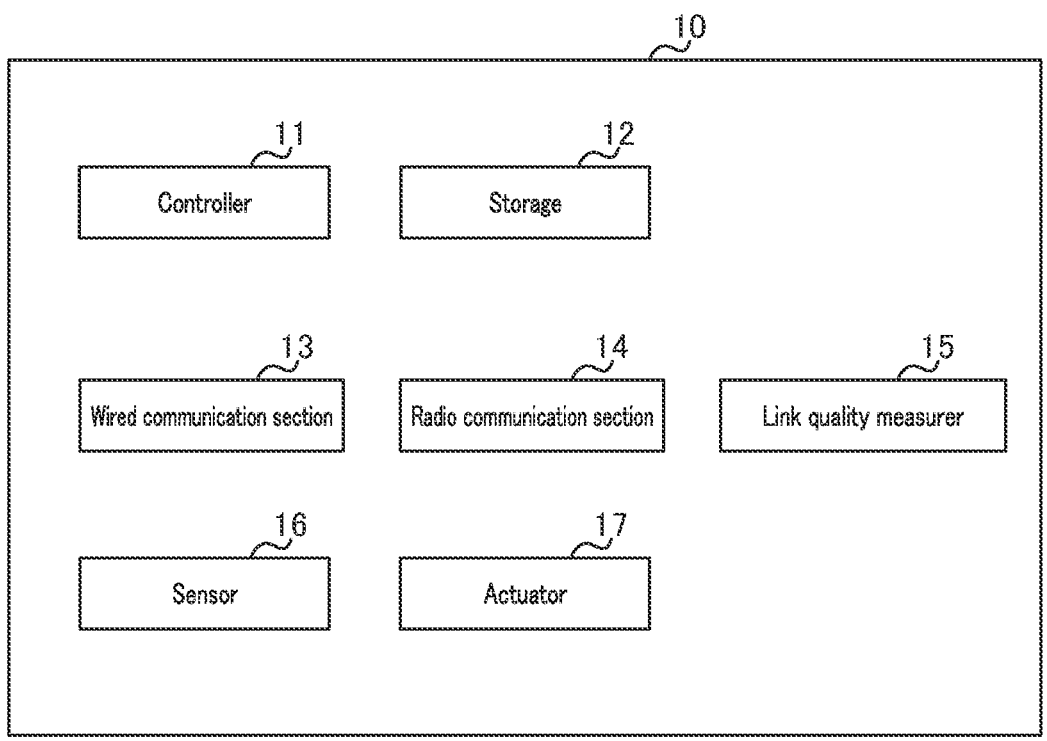
FIG. 2 is a block diagram illustrating an example of a configuration of a radio node.

FIG. 2 is a block diagram illustrating a configuration example of radio node 10 according to an exemplary embodiment of the present disclosure. Each of radio nodes 0 to 6 illustrated in FIG. 1A may have, for example, the configuration of radio node 10 illustrated in FIG. 2.

In FIG. 2, radio node 10 may include, for example, controller 11, storage 12, wired communication section 13, radio communication section 14, link quality measurer 15, sensor 16, and actuator 17.

Radio node 10 forwards or collects sensor data (e.g., message) in a wireless sensor network (e.g., radio network 100) for wirelessly collecting data sensed, for example, by sensor 16. Further, radio node 10 may also control actuator 17 based on the collected data.

Controller 11 controls, for example, the entire operation or processing of radio node 10. For example, the processing of radio node 10 may be controlled based on a program code or data stored in storage 12. Controller 11 may be composed of, for example, a microprocessor.

Storage 12 stores, for example, program codes or data to be executed by controller 11. Storage 12 may be composed, for example, of a Random Access Memory (RAM) or a Read Only Memory (ROM).

Wired communication section 13 is an interface that performs wired communication between radio node 10 and an external apparatus (not illustrated). For example, wired communication section 13 is an interface for communicating with another apparatus such as sensor 16, actuator 17 or the external apparatus (not illustrated). Wired communication section 13 may perform wired communication such as serial communication, and communication using Inter-Integrated Circuit (I2C), Serial Peripheral Interface (SPI), General Purpose Input/Output (GPIO), Universal Serial Bus (USB), and Ethernet (registered trademark), for example. Note that, the wired communication system of wired communication section 13 is not limited to the above.

Radio communication section 14 is an interface for performing radio communication between radio nodes 10. Radio communication section 14 may perform radio communication such as low-power communication in the 920-MHz band, and communication using ZigBee (registered trademark), Bluetooth (registered trademark), and WiFi (registered trademark), for example. Note that, the radio communication system of radio communication section 14 is not limited to the above.

Note that, at least one of wired communication section 13 and radio communication section 14 mounted may be multiple in number according to a corresponding communication protocol. In addition, communication between radio node 10 and the external apparatus is not limited to wired communication, but may be radio communication. Therefore, radio node 10 may have a configuration in which wired communication section 13 is omitted.

Link quality measurer 15 measures the link quality between radio node 10 and another radio node based on a radio signal received by radio communication section 14, and generates information indicating a measurement result (for example, link quality log information described later). The link quality may be, for example, an indicator of the quality of a received signal, such as Receive Signal Strength Indicator (RSSI), Signal to Noise Ratio (SNR), or a bit error rate. Note that, the processing of link quality measurer 15 may be performed in radio communication section 14.

Sensor 16 senses the external environment, for example. Sensing the external environment may include, for example, sensing the temperature, humidity, and illuminance.

Actuator 17 performs, for example, actuation into the external environment. Actuator 17 may perform actuation such as, for example, turning on a Light Emitting Diode (LED), displaying an image on the display, operating a servomotor, or the like.

Note that at least one of sensor 16 and actuator 17 mounted on radio node 10 may be multiple in number. Alternatively, at least one of sensor 16 and actuator 17 does not have to be mounted on radio node 10. For example, radio node 10 may be connected with an external sensor or actuator via wired communication section 13 (or radio communication section 14).

Radio Network Operation Example

Figure 3:
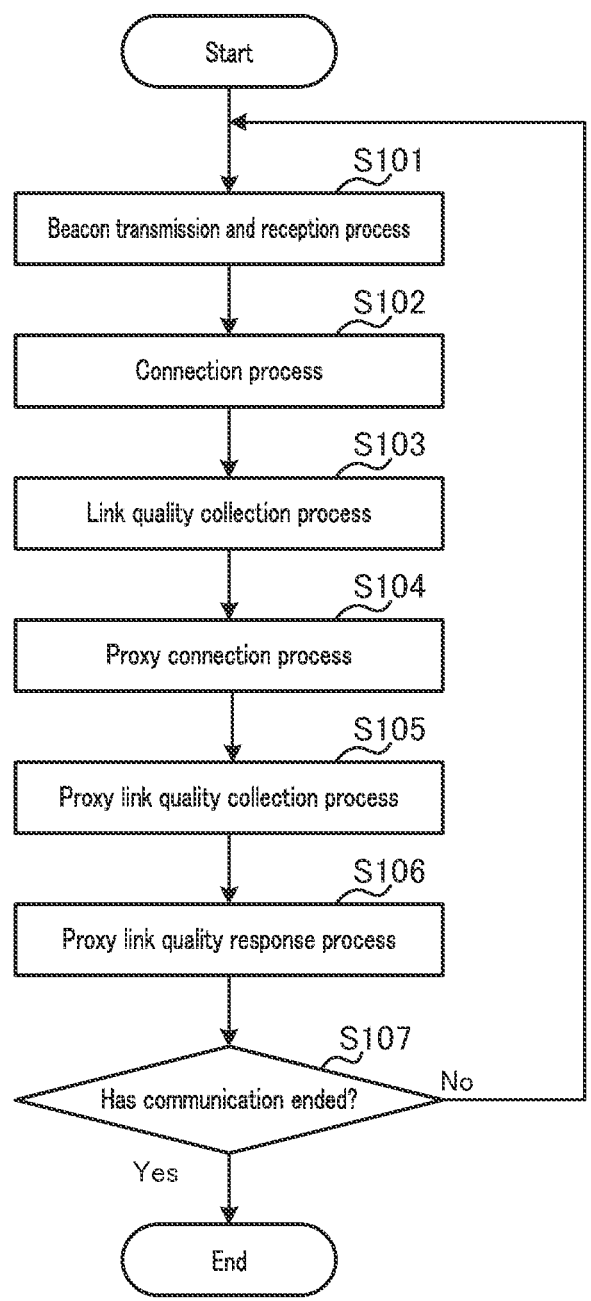
FIG. 3 is a flowchart illustrating an example of operation in a radio network.

FIG. 3 is a flowchart illustrating an example of the operation in radio network 100 according to an exemplary embodiment of the present disclosure.

In radio network 100, one of a plurality of radio nodes 10 is configured as a "parent node" and begins the operation illustrated in FIG. 3. The method of determining the parent node from among the plurality of radio nodes 10 may be, for example, a method in which roles (including the role of the parent node) are preconfigured for the plurality of radio nodes 10, a method in which the parent node (for example, radio node 10 to be started first) is configured based on a starting order among the plurality of radio nodes 10, or another method.

By way of example, a description will be given below of a case where radio node 0 is configured as the parent node in radio network 100 illustrated in FIG. 1A.

In FIG. 3, radio node 10 performs a transmission and reception process for transmitting and receiving a beacon (S101). Note that, the "beacon" is an example of a signal (sent signal) that radio node 10 periodically sends.

For example, the parent node periodically transmits a signal (e.g., a packet) called "beacon" that includes control information. The beacon may include, for example, information indicating that radio node 0 is the parent node. The beacon may also include, for example, information indicating the address of the parent node. The beacon may also include information on the configuration of radio network 100, such as a transmission periodicity of the beacon, for example. Another radio node 10 different from the parent node (radio node 0) receives the beacon to, for example, detect the parent node located near the other radio node 10 and detect that radio network 100 is operating.

Further, the transmission periodicity of the beacon may be configured according to, for example, the number of radio nodes 10 that can communicate with the parent node (radio node 0). For example, the larger the number of radio nodes 10 that can communicate with the parent node, the longer the transmission periodicity may be.

In FIG. 3, the parent node (radio node 0) and radio node 10 having received the beacon perform a connection process for connection between the parent node (radio node 0) and radio node 10 (S102).

For example, radio node 10 having received the beacon transmits a packet including connection request information (for example, denoted by "REG") to the parent node. Radio node 10, for example, waits a predetermined time until radio node 10 receives a packet including connection permission information (for example, denoted by "RCK") from the parent node. Meanwhile, after the parent node receives the connection request information and when connection permission can be granted to radio node 10 having transmitted REG, the parent node transmits the packet including the connection permission information (for example, RCK). The parent node may, for example, transmit the packet including the connection permission information, or may transmit another transmission packet, such as the beacon, including the connection permission information. When radio node 10 receives the connection permission information, radio node 10 is configured as a "child node" for the parent node (radio node 0) and enters a connection state (for example, a state in which a radio link is established) with the parent node.

Note that, when the parent node (radio node 0) does not permit, to connect, radio node 10 having transmitted REG, the parent node (radio node 0) may omit transmission of the connection permission information to radio node 10 having transmitted REG, for example, or may transmit, to radio node 10 having transmitted REG, information indicating that the connection is not permitted. Further, based on, for example, a preconfigured connection permission node table or the upper limit of the number of child nodes that can be connected, the parent node may judge whether or not radio node 10 can be granted the connection permission.

For example, in FIG. 1A, the beacon transmitted by the parent node (radio node 0) may be received by radio nodes 1, 2, and 3 located within communication area 101 of radio node 0. Thus, in FIG. 1A, radio nodes 1, 2, and 3 may be configured as child nodes for radio node 0.

In FIG. 3, the parent node and each of the child nodes perform a link quality collection process of transmitting and receiving information on the link quality (for example, also referred to as link quality log information) (S103).

For example, the parent node transmits a packet including link quality request information (for example, "REQ") to the child node. After receiving the link quality request information, the child node transmits, to the parent node, a packet including the link quality log information (in other words, ACK for the link quality request information "REQ") retained when the child node receives the link quality request information.

For example, when each radio node 10 (e.g., child node) receives a signal transmitted by another radio node 10 (including another child node) different from the parent node (radio node 0), radio node 10 having received the signal may measure the link quality between radio node 10 (parent node) and the other radio node 10 (child node) based on the received signal and store the link quality log information including a measured value of the link quality.

After receiving the link quality log information transmitted by each child node, the parent node may combine, for example, these pieces of link quality log information to generate a "link quality matrix." For example, in the link quality matrix, a row may represent a transmission node, a column may represent a reception node, and each element of the matrix may represent the link quality (e.g., RSSI) between the transmission and reception nodes. Note that, the matrix configuration of the link quality matrix is not limited to this example. The parent node may identify the link qualities between a plurality of radio nodes 10 including the child nodes within radio network 100 based on, for example, the link quality matrix.

In FIG. 3, the child node and other radio nodes 10 different from both the parent node and the child node perform a proxy connection process (S104).

For example, radio nodes 10 may include other radio nodes 10 (e.g., radio nodes 4 to 6 in FIG. 1A) that do not directly communicate with the parent node (e.g., radio node 0 in FIG. 1A) but directly communicate with the child node (e.g., any of radio nodes 1 to 3 in FIG. 1A). For example, the other radio nodes 10 do not receive the beacon transmitted by the parent node but receive the packet including the link quality log information transmitted by the child node. For example, in the example illustrated in FIG. 1A, radio nodes 4, 5, and 6 are located at least within communication area 102, and thus receive (in other words, intercept) a packet (including, for example, link quality log information) transmitted by radio node 2 (child node).

Such radio nodes 10 can detect the presence of radio network 100, for example, based on the link quality log information transmitted by the child node. When radio nodes 10 (for example, radio nodes 4 to 6 in FIG. 1A) detect radio network 100, radio nodes 10 transmit, for example, a packet including proxy connection request information (for example, denoted by "pREG: proxy_REG") to the child nodes (for example, radio nodes 1 to 3 in FIG. 1A). For example, radio nodes 10 may determine, from among the plurality of child nodes, radio node 10 (in other words, a below-described relay node) which performs the proxy connection process, based on the link qualities between radio nodes 10 and the plurality of child nodes with which radio nodes 10 can directly communicate.

Then, radio nodes 10 (for example, radio nodes 4 to 6 in FIG. 1A) wait a specified time until, for example, a packet including proxy connection permission information (for example, denoted by "pRCK: proxy_RCK") is received from the child node. Meanwhile, after receiving the proxy connection request information, the child node transmits the packet including the proxy connection permission information when radio nodes 10 having transmitted pREG can be granted the connection permission.

When radio nodes 10 (for example, radio nodes 4 to 6 in FIG. 1A) receive the proxy connection permission information, radio nodes 10 are configured, for example, as "grandchild nodes" for the parent node. Further, the child nodes are configured as the "relay nodes" for the grandchild nodes as a result of transmission of the proxy connection permission information. By the proxy connection process of S104, the child nodes (in other words, the relay nodes) and the grandchild nodes enter the connected state. In other words, the proxy connection permission information transmitted by the child nodes to the grandchild nodes indicates that the child nodes function as the relay nodes between the parent node and the grandchild nodes.

Note that, when any of the child nodes does not permit, to connect, radio node 10 having transmitted pREG, the child node may omit transmission of the connection permission information to radio node 10 having transmitted pREG, or may transmit, to radio node 10 having transmitted, for example, pREG, the information indicating that the proxy connection is not permitted. Further, based on, for example, a preconfigured connection permission node table, a child node table of child nodes that can relay and connect the radio nodes, or an upper limit of the number of grandchild nodes that can be connected that is received from the parent node, the child node may judge whether or not the proxy connection permission can be granted to radio node 10 having transmitted pREG.

Further, the parent node receives (in other words, intercepts) the packet including the proxy connection permission information transmitted by the relay node (in other words, the child node). The parent node may detect the presence of a grandchild node and the connection state between the relay node and the grandchild node by receiving the proxy connection permission information.

In FIG. 3, the parent node, the relay node (e.g., the child node), and the grandchild node perform a proxy link quality collection process (S105). The proxy link quality collection process is, for example, a process in which the relay node (in other words, a proxy of the parent node) collects the link quality log information retained by the grandchild node.

For example, the relay node transmits a packet including proxy link quality request information (e.g., "pREQ: proxy_REQ") to the grandchild node. After receiving the proxy link quality request information, the grandchild node transmits, to the relay node, a packet including proxy link quality log information (in other words, ACK for the proxy link quality request information) indicating the link quality retained when the grandchild node receives the proxy link quality request information.

After receiving pieces of proxy link quality log information transmitted by grandchild nodes, the relay node may, for example, combine these pieces of proxy link quality log information and generate a proxy link quality matrix. The relay node may, for example, partially identify the link qualities between radio nodes 10 within radio network 100 based on the proxy link quality matrix.

Note that, in the proxy link quality collection process, when the parent node transmits the packet including the link quality request information (REQ) to the relay node, for example, the parent node may transmit, to the relay node, reserved allocation information on a slot in which the relay node performs the proxy link quality collection for the grandchild nodes. The relay node may transmit the packet including the proxy link quality request information to the grandchild nodes in the slot indicated in the received reserved allocation information (in other words, the reserved slot).

In FIG. 3, the parent node and the relay node performs a proxy link quality response process (S106).

For example, when the relay node transmits, to the parent node, the link quality log information indicating the link quality between the relay node and another radio node 10, the relay node may transmit, to the parent node, the proxy link quality log information including the link quality matrix of link qualities between the relay node and the grandchild nodes retained by the relay node. The parent node may, for example, combine the received proxy link quality log information with the retained link quality matrix, and may store the link quality matrix. The link quality matrix combined allows the parent node to identify the link qualities between the plurality of radio nodes 10 including the child and grandchild nodes within radio network 100.

The parent node may perform a scheduling process such as reassigning the relay node or selecting a communication path between radio nodes 10, for example, based on the link qualities between the plurality of radio nodes 10 indicated in the link quality matrix.

Note that, a data packet between radio nodes 10 (e.g., sensed data and control data of actuator 17) may be included in packets transmitted respectively by the parent node, the child node (or the relay node), and the grandchild node.

In FIG. 3, when a communication process has not ended (S107: No), radio node 10 returns to the process of S101 and repeats the above-described processes. On the other hand, when the communication process has ended (S107: Yes), radio node 10 ends the process.

Next, an example of each of the processes illustrated in FIG. 3 (for example, processes of S102 to S106) will be described.

By way of example, an operation of radio nodes 0 to 6 included in radio network 100 illustrated in FIG. 1A will be described below. Further, a case in which radio node 0 from among radio nodes 0 to 6 is configured as the parent node will be described.

Note that, in the following, a communication method between radio nodes 10 is, for example, either broadcast communication or unicast communication. However, the communication method between radio nodes 10 is not limited to these.

Connection Process (Processes of S101 and S102 Illustrated in FIG. 3)

Figure 4:
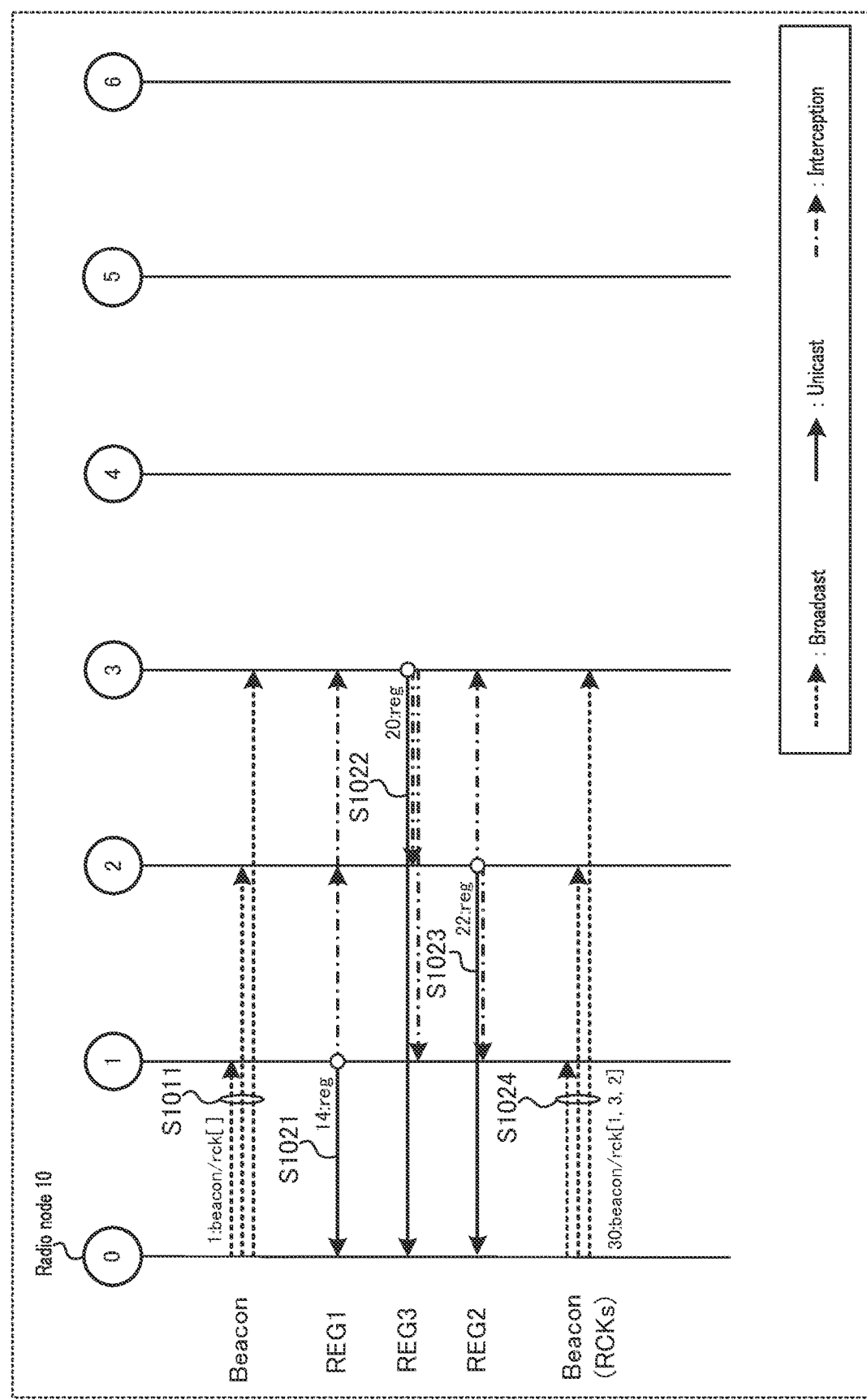
FIG. 4 is a sequence diagram illustrating an example of a connection process.

FIG. 4 is a sequence diagram illustrating an example of the connection process.

Radio node 0, which is the parent node, periodically transmits beacons (S1011).

In FIG. 1A, since communication area 101 of radio node 0, which is the parent node, includes radio nodes 1, 2, and 3, radio nodes 1, 2, and 3 receive the beacons transmitted by radio node 0. In other words, in FIG. 1A, radio nodes 4, 5, and 6 located outside communication area 101 do not receive the beacons transmitted by radio node 0.

In FIG. 4, radio nodes 1, 2, and 3 having received the beacons transmit, for example, the packet including the connection request information (REG) to the parent node (radio node 0) (S1021, S1022, and S1023). Radio nodes 1, 2, and 3 may determine transmission timings based on a transmission method such as transmission after carrier sensing or random back-off transmission, for example. This determination of the transmission timings can reduce the probability of collision between packets transmitted respectively by radio nodes 1, 2, and 3.

By way of example, in FIG. 4, among radio nodes 1, 2, and 3, radio node 1 first transmits the packet including the connection request information (REG) (S1021), and then radio node 3 transmits the connection request packet (REG) (S1022), and finally, radio node 2 transmits the connection request packet (REG) (S1023). Note that, since radio nodes 1, 2, and 3 receive (in other words, intercept) a packet transmitted by another radio node 10, radio nodes 1, 2, and 3 may, for example, measure (not illustrated) the link qualities between each of radio nodes 0, 1, and 2 and the other radio node 10.

When radio node 0 permits connection requested by radio nodes 1, 2, and 3, radio node 0 transmits the connection permission information (RCK) to radio nodes 1, 2, and 3 (S1024). For example, radio node 0 may include the connection permission information for a plurality of radio nodes 10 in a beacon (in other words, a broadcast signal) to be transmitted next. In addition, the connection permission information may include, for example, a radio node number (e.g., an address) to which the connection permission is granted. In the example illustrated in FIG. 4, the connection permission information (RCK) includes information (e.g., rck[1, 3, 2]) indicating the order of radio nodes 10 to which the connection is permitted (e.g., the order of 1, 3, and 2). Note that radio node 0 may include the connection permission information for each of the plurality of radio nodes 10 in an individual packet (in other words, a unicast signal).

Figure 5:
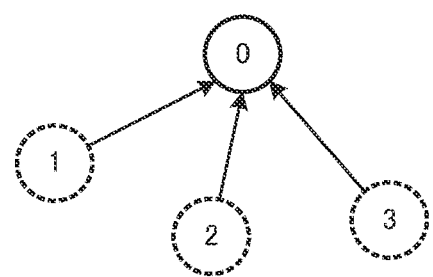
FIG. 5 illustrates an example of communication paths between radio nodes.

When receiving the beacon including the connection permission information, radio nodes 1, 2, and 3 determine that the connection with the parent node is permitted and that radio nodes 1, 2, and 3 (hereinafter, referred to as child nodes 1, 2, and 3) are configured respectively as the child nodes for radio node 0 being the parent node (hereinafter, referred to as parent node 0). FIG. 5 illustrates an example of connection relation between radio nodes 10 (parent node 0 and child nodes 1 to 3) after the process of S1024 illustrated in FIG. 4 is performed. In FIG. 5, radio node 10 indicated by the solid line is the parent node and radio nodes 10 indicated by the dotted lines are the child nodes. In addition, the solid arrows indicate upload communication. That is, in FIG. 5, radio node 0 indicated by the solid line is parent node 0, radio nodes 1, 2, and 3 indicated by the dotted lines are child nodes 1, 2, and 3, and parent node 0 is connected with each of child nodes 1, 2, and 3.

Link Quality Collection Process (Process of S103 Illustrated in FIG. 3)

Figure 6:
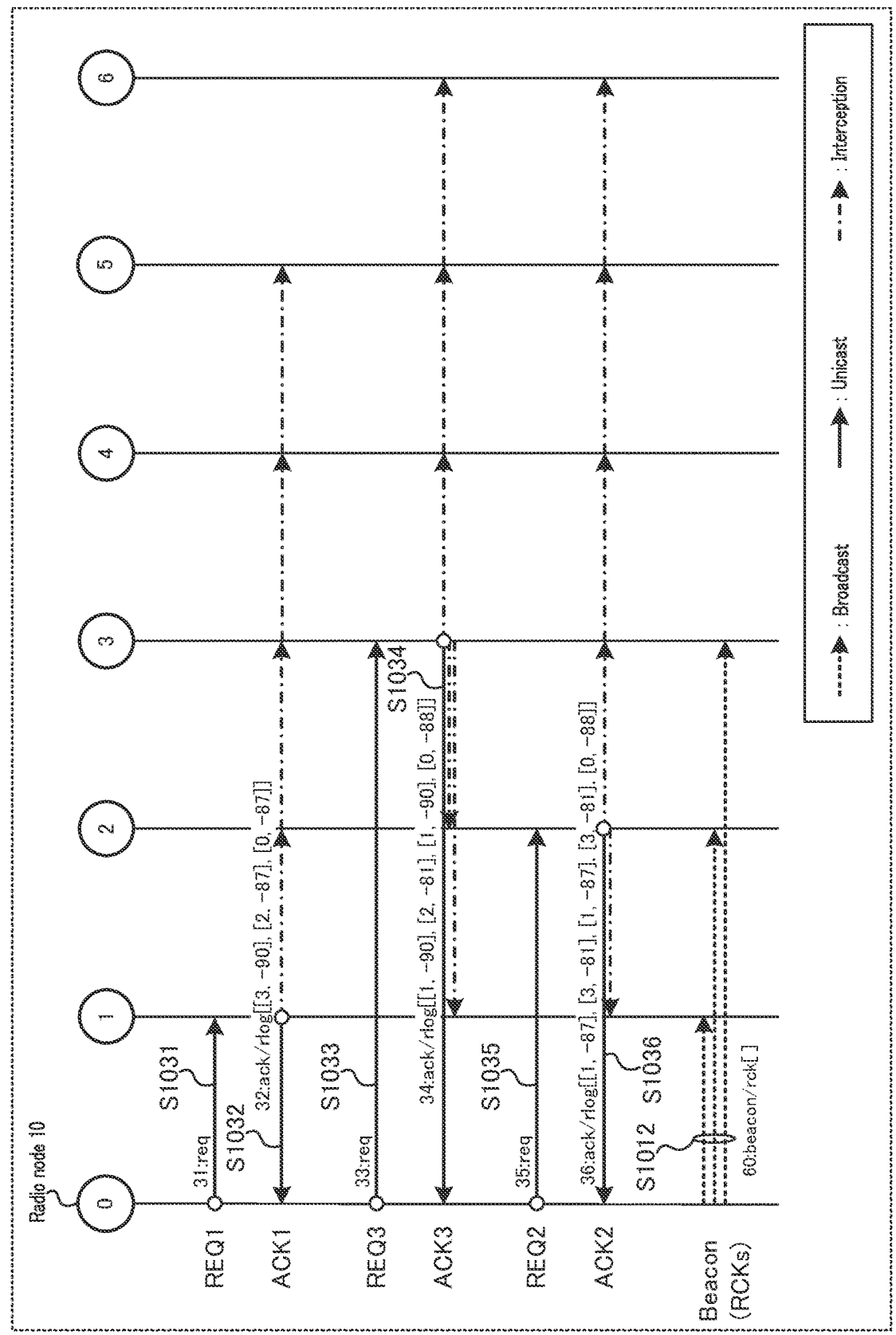
FIG. 6 is a sequence diagram illustrating an example of a link quality collection process.

FIG. 6 is a sequence diagram illustrating an example of the link quality collection process. The process illustrated in FIG. 6 illustrates, for example, processing after the transmission and reception of beacons illustrated in FIG. 4 (for example, processing of S1024 illustrated in FIG. 4.

After transmitting the connection permission information to child nodes 1, 2, and 3 (after the processing of S1024 illustrated in FIG. 4), parent node 0 transmits a packet including link quality request information (REQ) to each of child nodes 1, 2, and 3. By way of example, in the example illustrated in FIG. 6, parent node 0 transmits the link quality request information to child nodes 1, 3, and 2 in the order of child nodes 1, 3, and 2 according to the order of radio nodes 10 to which transmissions are performed at "Beacon" in FIG. 4. Note that, the order of radio nodes 10 can be configured randomly, for example, and in this case, an earlier order may be given to radio node 10 for which the link quality has not yet been collected.

For example, parent node 0 transmits the link quality request information (REQ) to child node 1 (S1031). For example, child node 1 transmits, to parent node 0, the link quality response information (ACK) including the link quality log information (for example, "rlog") retained when receiving the link quality request information (S1032). Parent node 0 receives the link quality log information transmitted by child node 1 and stores it in a link quality matrix.

For example, child node 1 may receive (or intercept) the packets from parent node 0 (e.g., beacons received in S1011 and S1024 illustrated in FIG. 4) and the packets transmitted by the other child nodes 2 and 3 (e.g., packets transmitted in S1022 and S1023 illustrated in FIG. 4), and may measure the link qualities (e.g., RSSIs) between other radio nodes 10 and child node 1 based on the received signals.

Further, the link quality log information may be represented by a list including, for example, a set [sa, rssi] of a transmitter address (e.g., a radio node number) "sa" and an RSSI "rssi". In FIG. 6, the link quality log information transmitted by child node 1 is, for example, [[3, −90], [2, −87], [0, −87]]. The link quality log information [3, −90] indicates RSSI (rssi)=−90 between child node 3 (sa=3) and child node 1, the link quality log information [2, −87] indicates RSSI (rssi)=−87 between child node 2 (sa=2) and child node 1, and the link quality log information [0, −87] indicates RSSI (rssi)=−87 between parent node 0 (sa=0) and child node 1.

Note that, child nodes 2 and 3 receive (in other words, intercept) the packet including the link quality log information transmitted by child node 1. Therefore, for example, child nodes 2 and 3 may measure the link quality (e.g., RSSI) of the packet transmitted by child node 1 and add, to the retained link quality log information, the link quality log information for which child node 1 (sa=1) is the transmitter. In the example illustrated in FIG. 6, [1, −87] is added to the link quality log information of child node 2, and [1, −90] is added to the link quality log information of child node 3. Note that, in FIG. 6, the old information is not deleted and left listed in the link quality log information. Thus, regarding pieces of information indicating the same node, a value of one of the pieces of information which is nearer to the front is the newer information.

Further, for example, in radio network 100 illustrated in FIG. 1A, other radio nodes 4 and 5 that can be connected with child node 1 receive (in other words, intercept) the packet including the link quality log information transmitted by child node 1. Therefore, for example, radio nodes 4 and 5 may measure the link quality (e.g., RSSI) of the packet including the link quality log information transmitted by child node 1, and add (in other words, update), to the retained link quality log information, the link quality log information for which child node 1 (sa=1) is the transmitter.

Note that, also in the below-described processes, other radio nodes 10 located in a communication area of each radio node 10 in radio network 100 illustrated in FIG. 1A may receive (in other words, intercept) a packet transmitted by each radio node 10 and update the link quality log information.

Likewise, in FIG. 6, parent node 0 transmits the link quality request information (REQ) to child node 3 (S1033). After receiving the link quality request information, child node 3 transmits the link quality response information (ACK) including the link quality log information to parent node 0 (S1034).

Further, parent node 0 transmits the link quality request information (REQ) to child node 2 (S1035). After receiving the link quality request information, child node 2 transmits the link quality response information (ACK) including the link quality log information to parent node 0 (S1036).

In addition, parent node 0 transmits the beacons according to, for example, a beacon periodicity (S1012).

Figure 7:
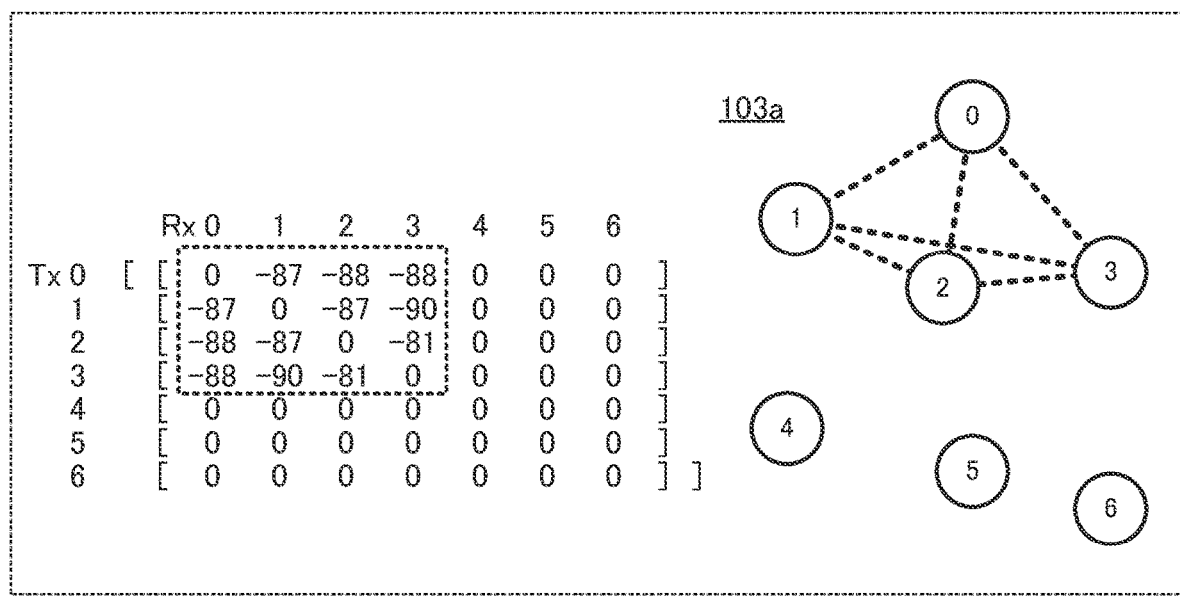
FIG. 7 illustrates an example of a link quality matrix.

For example, at the end of the process illustrated in FIG. 6, parent node 0 retains the link quality matrix including the link qualities (e.g., RSSIs) for communication paths 103a illustrated in FIG. 7. Note that, for example, parent node 0 may measure the link qualities (e.g., RSSIs) based on the packets transmitted by child nodes 1, 2, and 3, and add, to the retained link quality log information, the link quality log information for which child nodes 1, 2, and 3 (sa=1, 2, 3) are the transmitters. By way of example, in FIG. 7, the link quality log information generated based on the packets transmitted by child nodes 1, 2, and 3 to parent node 0 is [[1, −87], [2, −88], [3, −88]].

Figure 8:
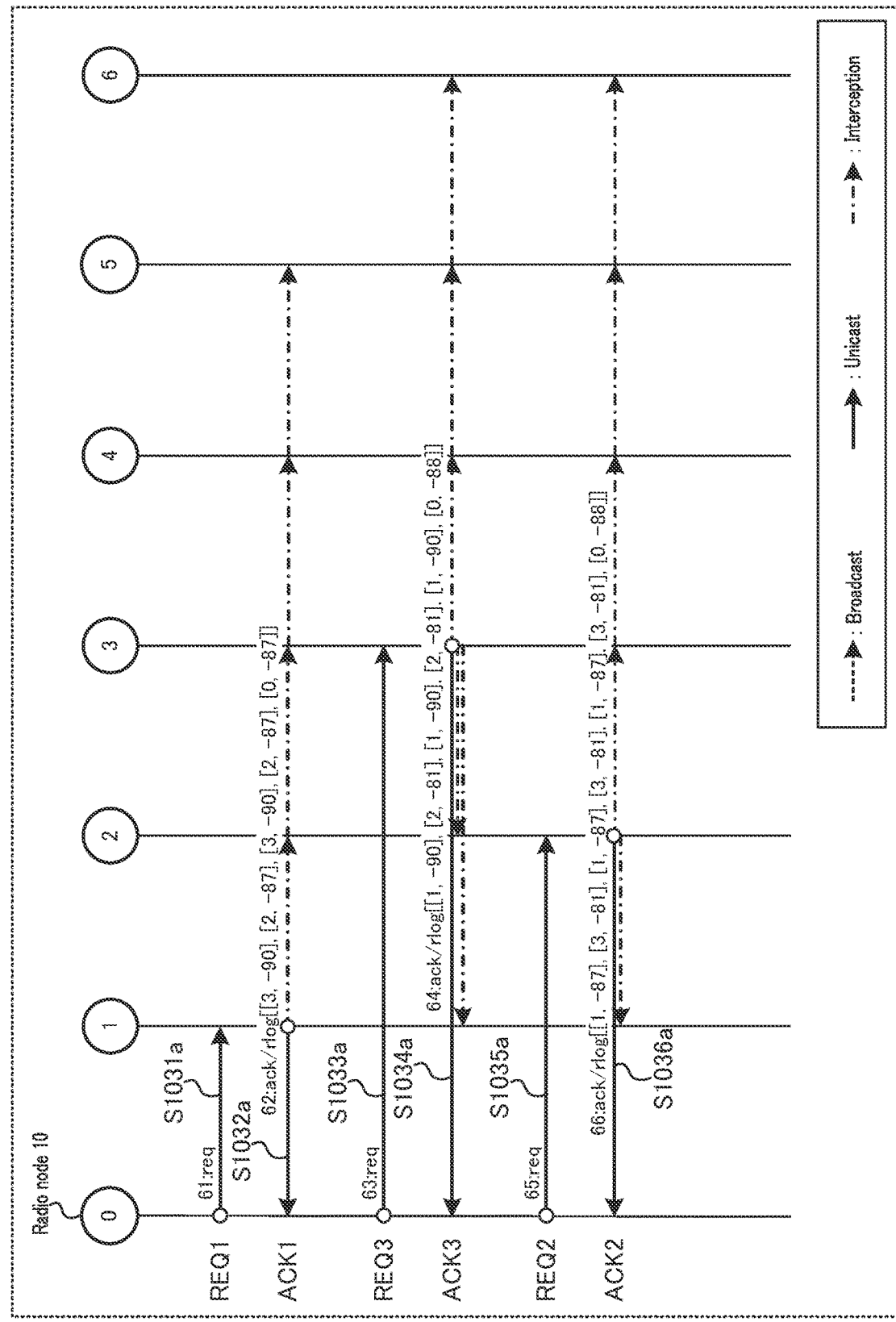
FIG. 8 is a sequence diagram illustrating an example of the link quality collection process.

FIG. 8 exemplarily illustrates the link quality collection process (processes of S1031a to S1036a) for child nodes 1 to 3 after the transmission of the beacons (after the process of S1012) illustrated in FIG. 6. In radio network 100, parent node 0 identifies (or updates) the link qualities between the radio nodes in the radio network by repeating such a link quality collection process (see, for example, FIGS. 8, 12, and 14).

Proxy Connection Process (Process of S104 Illustrated in FIG. 3)

Figure 9:
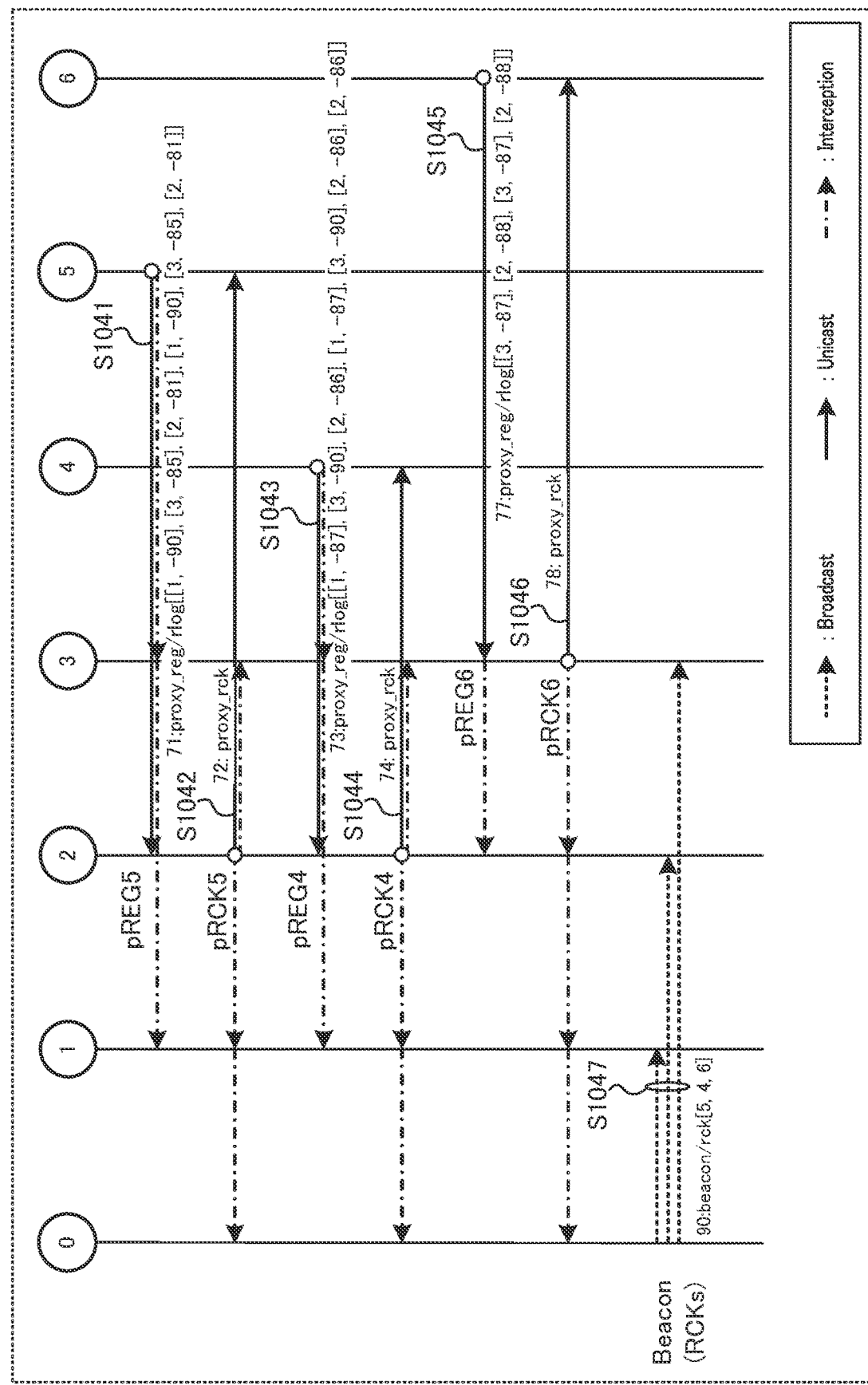
FIG. 9 is a sequence diagram illustrating an example of a proxy connection process.

FIG. 9 is a sequence diagram illustrating an example of the proxy connection process. The process illustrated in FIG. 9 illustrates processing after the link quality collection process illustrated in FIG. 8 (for example, the process of S1036a illustrated in FIG. 8).

Radio nodes 4, 5, and 6 do not receive beacons transmitted by parent node 0 because they are outside communication area 101 of parent node 0. Meanwhile, radio nodes 4, 5 and 6 receive (in other words, intercept) signals transmitted by child nodes 1, 2 and 3 to parent node 0, such as those transmitted, for example, at S1032, S1034, or S1036 illustrated in FIG. 6 or S1032a, S1034a, or S1036a illustrated in FIG. 8. Therefore, radio nodes 4, 5, and 6 may measure the link qualities between the transmitter child node and radio nodes 4, 5, and 6 based on the received signals, for example, and determine the child node to be configured as the relay node based on measured values of the link qualities.

For example, radio nodes 4, 5, and 6 transmit a packet including the proxy connection request information (pREG) to the child node configured as the relay node. For example, radio nodes 4, 5, and 6 may transmit the proxy connection request information to a child node that is a transmitter of one of the received packets which has a higher reception power (e.g., a packet having the highest reception power).

In FIG. 9, for example, radio node 5 transmits the proxy connection request information (pREG5) to child node 2 that is the transmitter of one of the intercepted packets which has the highest reception power (S1041). After receiving the proxy connection request information from radio node 5, child node 2 transmits the proxy connection permission information (pRCK5) to radio node 5 when it is judged that the proxy connection can be permitted (S1042). Upon receipt of the proxy connection permission information, radio node 5 determines that the connection with child node 2 is permitted and configured as grandchild node 5 for parent node 0.

Note that radio node 5 may transmit the retained link quality log information (for example, rlog[[1, −90], [3, −85], [2, −81], [1, −90], [3, −85], [2, −81]]) to child node 2 when transmitting the proxy connection request information (when performing the process of S1041). Child node 2 may add, to the link quality log information retained by child node 2, the link quality log information transmitted by radio node 5.

Further, radio nodes 10 (e.g., child nodes 1 and 3 and radio nodes 4 and 6) capable of directly communicating with radio node 5 receive (in other words, intercept) the proxy connection request information (packet transmitted in S1041) transmitted by radio node 5. Thus, for example, child nodes 1 and 3 may measure the link qualities between child nodes 1 and 3 and radio node 5 and generate the link quality log information based on the packet transmitted by radio node 5. Radio nodes 4 and 6 may similarly generate the link quality log information.

Further, the proxy connection permission information (packet transmitted in S1042) transmitted by child node 2 is also received (in other words, intercepted) by parent node 0 and child nodes 1 and 3. Therefore, for example, parent node 0 can detect the connection between child node 2 and grandchild node 5 (in other words, that child node 2 is configured as the relay node for grandchild node 5). Note that, parent node 0 may notify child nodes 1, 2, and 3 of the detection of grandchild node 5, for example, by using a beacon including the connection permission information (RCK) (the process of S1047 described below).

Similarly, radio node 4 transmits the proxy connection request information (pREG4) to child node 2 that is the transmitter of one of the intercepted packets which has the highest reception power (S1043), and child node 2 transmits the proxy connection permission information (pRCK4) to radio node 4 (S1044). By this proxy connection process, radio node 4 determines that radio node 4 is permitted to connect with child node 2 (for example, the relay node) and is configured as grandchild node 4 for parent node 0.

Likewise, radio node 6 transmits the proxy connection request information (pREG6) to child node 3 that is the transmitter of one of the intercepted packets which has the highest reception power (S1045), and child node 3 transmits the proxy connection permission information (pRCK6) to radio node 6 (S1046). Through this proxy connection process, radio node 6 determines that radio node 6 is permitted to connect with child node 3 (for example, the relay node) and is configured as grandchild node 6 for parent node 0.

Figure 10:
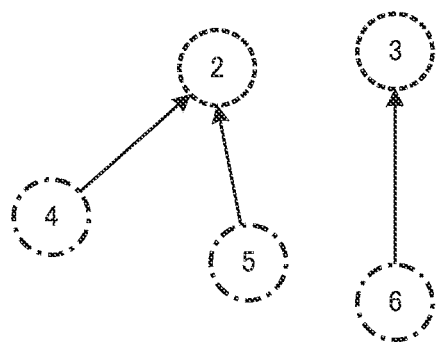
FIG. 10 illustrates an example of communication paths between radio nodes.

By the proxy connection process illustrated in FIG. 9, child node 2 is connected with grandchild nodes 4 and 5, and child node 3 is connected with grandchild node 6, for example, as illustrated in FIG. 10. In FIG. 10, radio nodes 10 indicated by one-dot chain lines are grandchild nodes 4, 5, and 6. Grandchild nodes 4 and 5 are connected with child node 2, and grandchild node 6 is connected with child node 3.

Figure 11:
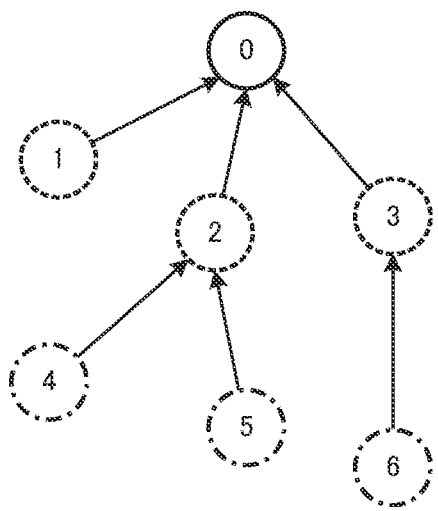
FIG. 11 illustrates an example of communication paths between radio nodes.

In FIG. 9, parent node 0 transmits the beacons including the connection permission information (RCK) on grandchild nodes 5, 4, and 6, for example, in accordance with a beacon periodicity (S1047). The connection relationship with the grandchild nodes is notified within radio network 100 by transmission of the connection permission information. FIG. 11 illustrates an example of connection relation between radio nodes 10 (parent node 0, child nodes 1 to 3, and grandchild nodes 4 to 6) after the process of S1047 illustrated in FIG. 9.

Proxy Link Quality Collection Process (Process of S105 Illustrated in FIG. 3)

Figure 12:
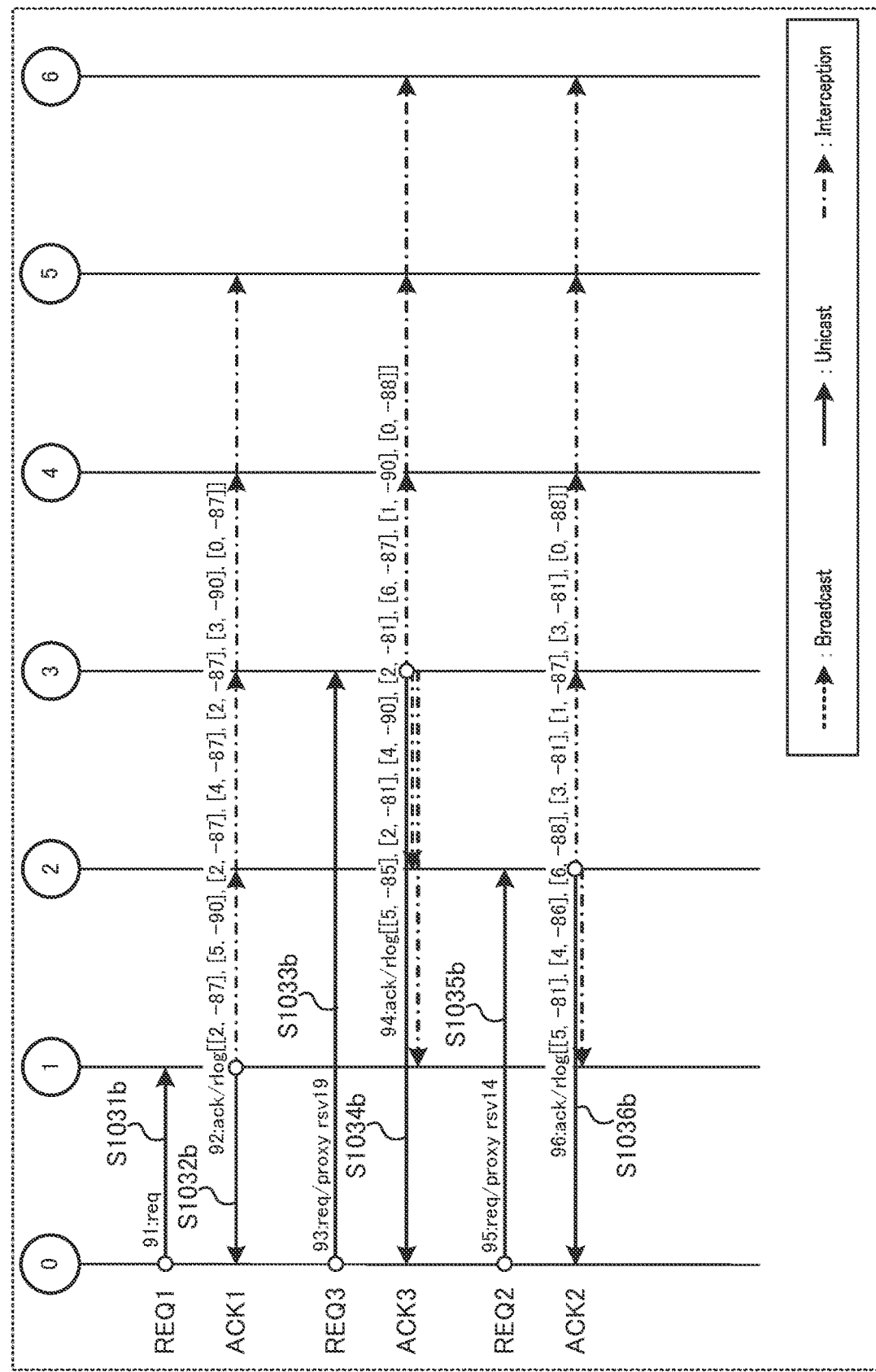
FIG. 12 is a sequence diagram illustrating an example of the link quality collection process.

FIG. 12 exemplarily illustrates the link quality collection process (processes of S1031*b* to S1036*b*) for child nodes 1 to 3 after the transmission of the beacons (after the process of S1047) illustrated in FIG. 9. The link quality collection process illustrated in FIG. 12 is, for example, the same as the link quality collection process illustrated in FIG. 6 or FIG. 8 (for example, the processes of S1031 to S1036 or S1031*a* to S1036*a*).

Note that, in FIG. 12, for example, the link quality request information (REQ2 transmitted in S1035*b*) transmitted by parent node 0 to child node 2 that is the relay node for grandchild nodes 4 and 5 may include information (for example, rsv14) indicating a time (for example, a reservation time) at which child node 2 performs the proxy link quality collection.

Likewise, for example, the link quality request information (REQ3 transmitted in S1033*b*) transmitted by parent node 0 to child node 3 that is the relay node for grandchild node 6 may include information (for example, rsv19) indicating a time (for example, a reservation time) at which child node 3 performs the proxy link quality collection.

Figure 13:
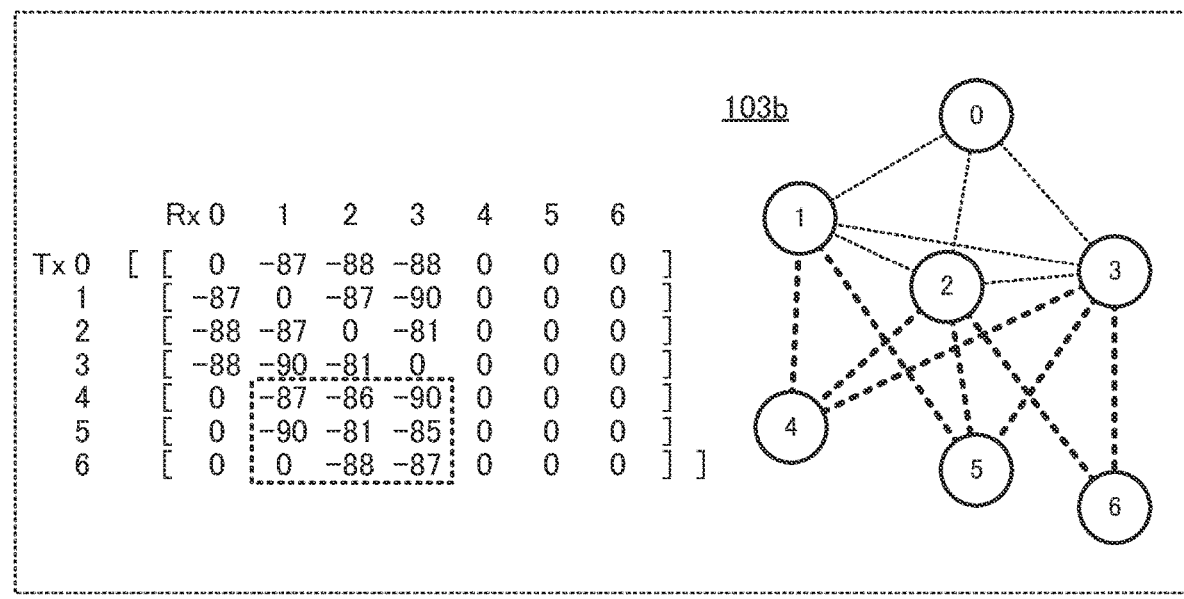
FIG. 13 illustrates an example of the link quality matrix.

At a time point when parent node 0 receives a packet from each of child nodes 1 to 3 in FIG. 12, parent node 0 can grasp the link quality log information (e.g., rlog) relevant to the link qualities of grandchild nodes 4 to 6 measured based on the packets received by the child nodes. For example, at the end of the process illustrated in FIG. 12, parent node 0 retains the link quality matrix including the link qualities (e.g., RSSIs) of communication paths 103*b* illustrated in FIG. 13. For example, by the link quality collection process illustrated in FIG. 12, parent node 0 can identify the link qualities transmitted by grandchild nodes 4 to 6 and received by child nodes 1, 2, and 3, as illustrated in FIG. 13 (e.g., a portion boxed by a dotted line).

Figure 14:
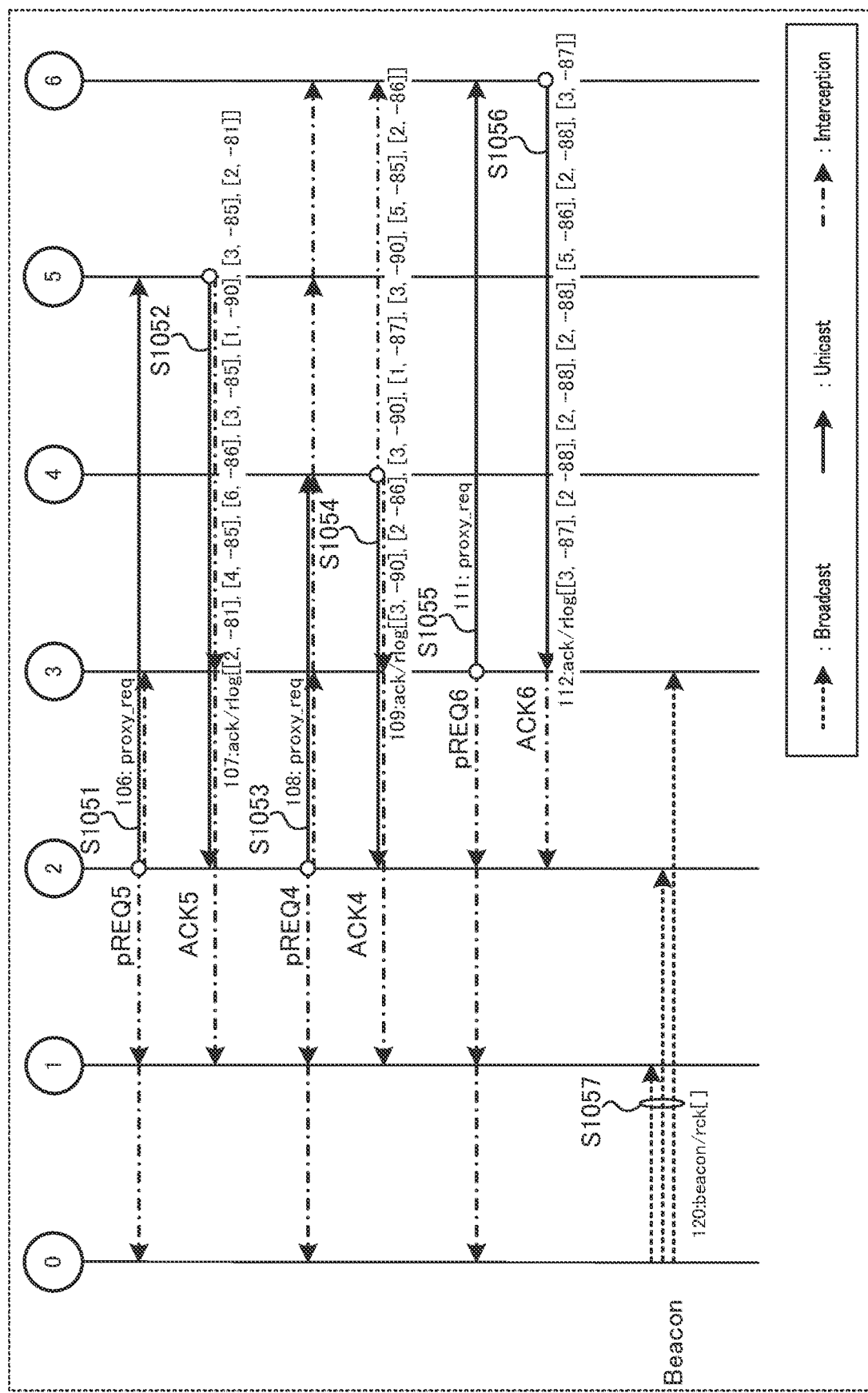
FIG. 14 is a sequence diagram illustrating an example of a proxy link quality collection process.

FIG. 14 is a sequence diagram illustrating an example of the proxy link quality collection process. The processes illustrated in FIG. 14 illustrate, for example, processes after the process of S1036*b* illustrated in FIG. 12.

Here, by way of example, a time after the time at which the process of S1036*b* is performed is allocated as the reservation time of proxy link quality collection for child node 2, and a time after the time at which the process of S1054 is performed is allocated as the reservation time of proxy link quality collection for child node 3. Note that, in FIG. 14, for the reason that child node 2 connects grandchild nodes 4 and 5, child node 2 connects preferentially over child node 3.

At the reservation time allocated by parent node 0, child node 2 (in other words, relay node 2) transmits the packet including the proxy link quality request information (pREQ5 and pREQ4) to grandchild nodes 5 and 4. For example, in FIG. 14, child node 2 transmits the proxy link quality request information (pREQ) to grandchild nodes 5 and 4 in the order of grandchild nodes 5 and 4, which is a randomly configured transmission order (S1051 and S1053).

For example, after receiving the proxy link quality request information (pREQ5), grandchild node 5 transmits the link quality response information (ACK5) including the link quality log information retained by grandchild node 5 to child node 2 (S1052). Likewise, for example, after receiving the proxy link quality request information (pREQ4), grandchild node 4 transmits the link quality response information (ACK4) including the link quality log information retained by grandchild node 4 to child node 2 (S1054).

Figure 15:
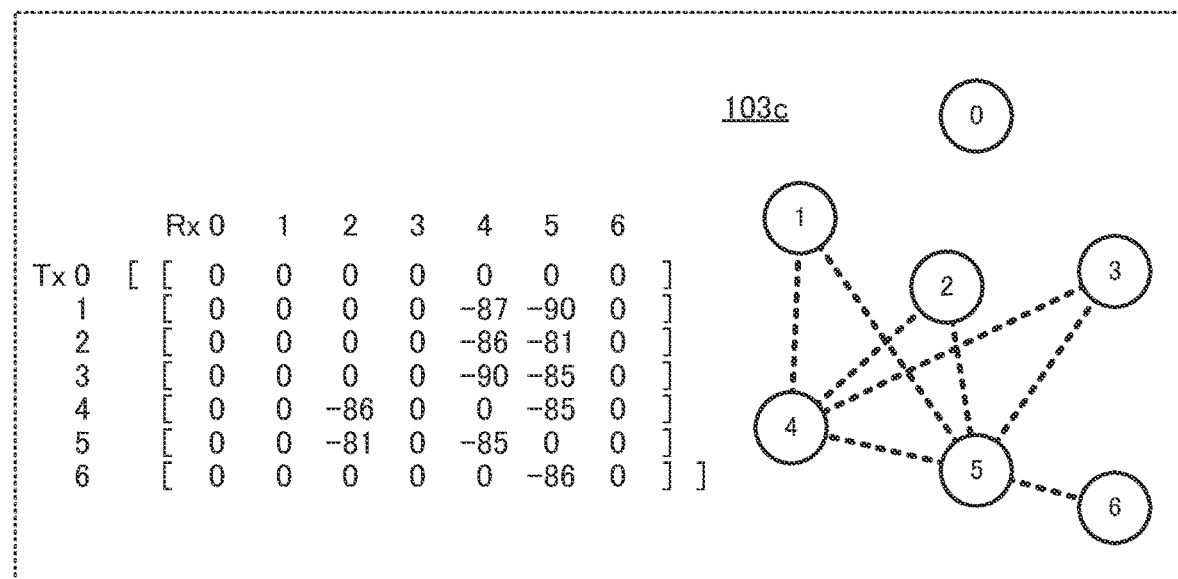
FIG. 15 illustrates an example of the link quality matrix and communication paths between radio nodes.

For example, at the end of the process of S1054 illustrated in FIG. 14, child node 2 retains the link quality matrix including the link qualities (e.g., RSSIs) relevant to grandchild nodes 4 and 5 in communication paths 103*c* illustrated in FIG. 15.

Likewise, at the reservation time allocated by parent node 0, child node 3 (in other words, relay node 3) transmits the proxy link quality request information (pREQ6) to grandchild node 6 (S1055). After receiving the proxy link quality request information, grandchild node 6 transmits the link quality response information (ACK6) including the link quality log information retained by grandchild node 6 to child node 3 (S1056).

Figure 16:
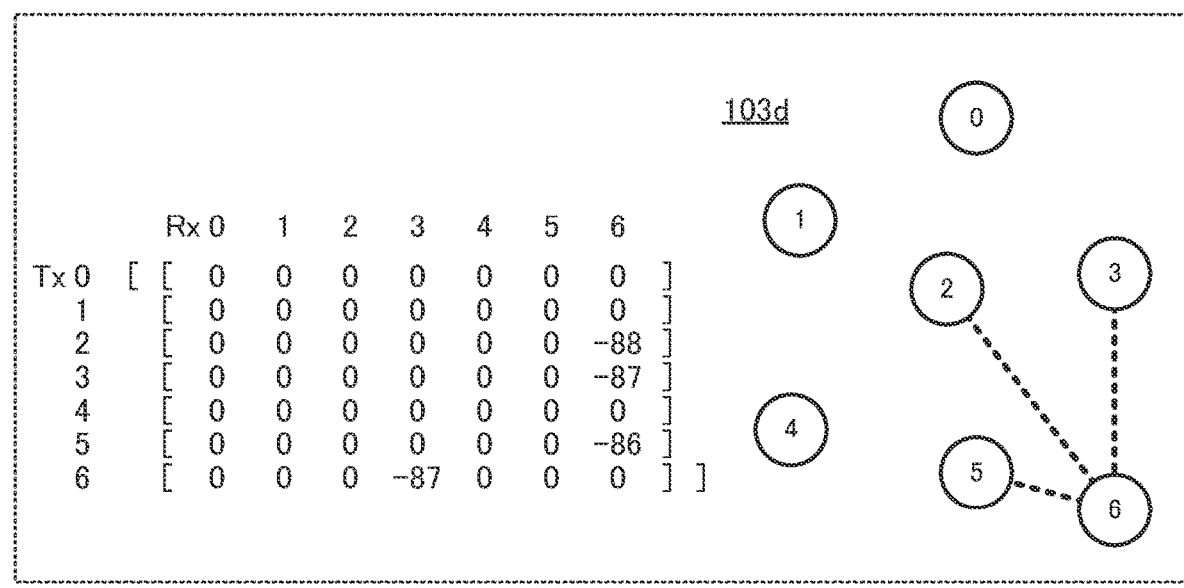
FIG. 16 illustrates an example of the link quality matrix and communication paths between radio nodes.

For example, at the end of the process of S1056 illustrated in FIG. 14, child node 3 retains the link quality matrix including the link qualities (e.g., RSSIs) relevant to grandchild node 6 in communication paths 103*d* illustrated in FIG. 16.

In FIG. 14, parent node 0 transmits beacons according to a beacon periodicity (S1057).

Proxy Link Quality Response Process (Process of S106 Illustrated in FIG. 3)

Figure 17:
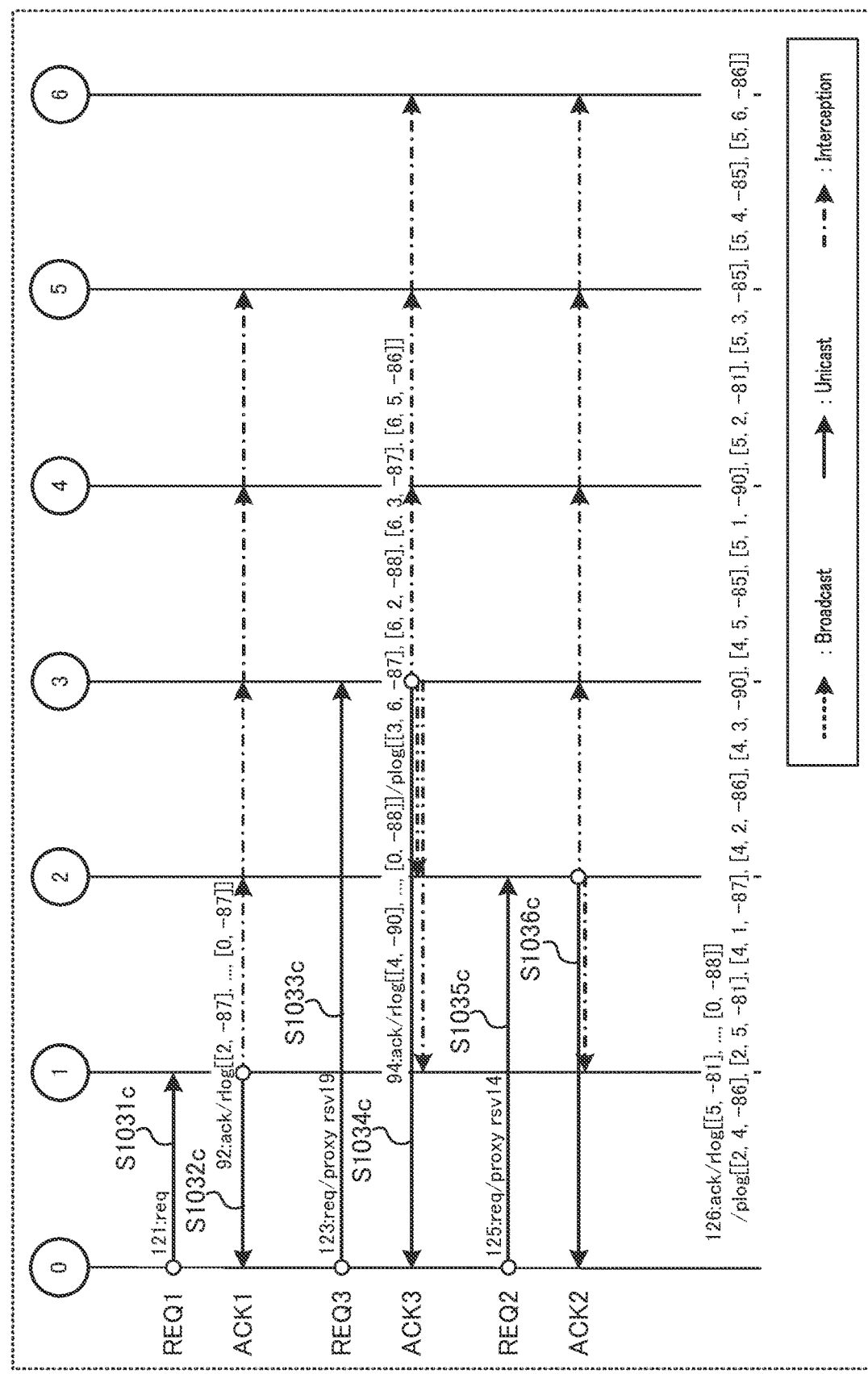
FIG. 17 is a sequence diagram illustrating an example of a proxy link quality response process.

FIG. 17 is a sequence diagram illustrating an example of the proxy link quality response process. The processes illustrated in FIG. 17 illustrate, for example, processes after the process of S1057 illustrated in FIG. 14.

The processing of S1031c to S1036c illustrated in FIG. 17 is, for example, the same as the link quality collection process illustrated in FIG. 3 (for example, see FIGS. 6, 8, and 12).

For example, in FIG. 17, child node 3 is the relay node for grandchild node 6. Therefore, in FIG. 17, in response to the link quality request (REQ3; processing of S1033c) of parent node 0, child node 3 transmits, to parent node 0, the response information (ACK3) including the proxy link quality log information (e.g., plog: ploxy log) indicating the link quality log information (e.g., see FIG. 16) relevant to grandchild node 6 that is retained by child node 3 (S1034c).

Proxy link quality log information "plog" is, for example, information obtained by adding destination (or addressee) address "da" to link quality log information "rlog" received by the child node, and may be represented by a list including a set [da, sa, rssi] of destination (or addressee) address "da," transmitter address "sa," and RSSI "rssi.

Similarly, for example, in FIG. 17, child node 2 is the relay node for grandchild nodes 4 and 5. Therefore, in FIG. 17, in response to the link quality request (REQ; processing of S1035c) of parent node 0, child node 2 transmits, to parent node 0, the response information (ACK) including the proxy link quality log information (e.g., plog) indicating the link quality log information (e.g., see FIG. 15) relevant to grandchild nodes 4 and 5 that is retained by child node 2 (S1034c).

When receiving the proxy link quality log information, parent node 0 combines, for example, the proxy link quality log information with the retained link quality matrix, and stores the resultant link quality matrix.

Further, child node 3 may transmit not only the proxy link quality log information (plog) but also the link quality log information (rlog) relevant to child node 3 to parent node 0, for example, as illustrated in FIG. 17. Likewise, child node 2 may transmit not only the proxy link quality log information (plog) but also the link quality log information (rlog) relevant to child node 2 to parent node 0, for example, as illustrated in FIG. 17. Further, as illustrated in FIG. 17, child node 1 is not configured as the relay node of any of radio nodes 10, and child node 1 may transmit, for example, the link quality log information (rlog) relevant to child node 1 to parent node 0 (S1032c).

Figure 18:
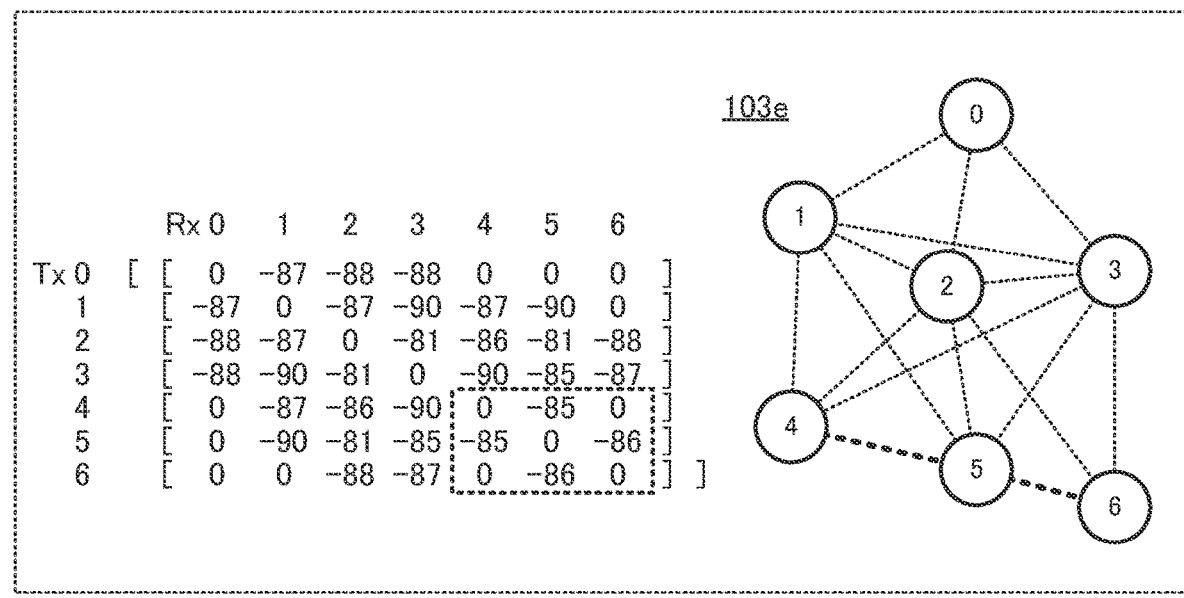
FIG. 18 illustrates an example of the link quality matrix and communication paths between radio nodes.

For example, at the end of the process of S1036c illustrated in FIG. 17, parent node 0 retains the link quality matrix including the link qualities (e.g., RSSIs) of communication paths 103e illustrated in FIG. 18. For example, by the proxy link quality response process illustrated in FIG. 17, parent node 0 can identify the link qualities between grandchild nodes 4, 5, and 6 as illustrated in FIG. 18 (e.g., a portion boxed by a dotted line).

Figure 19:
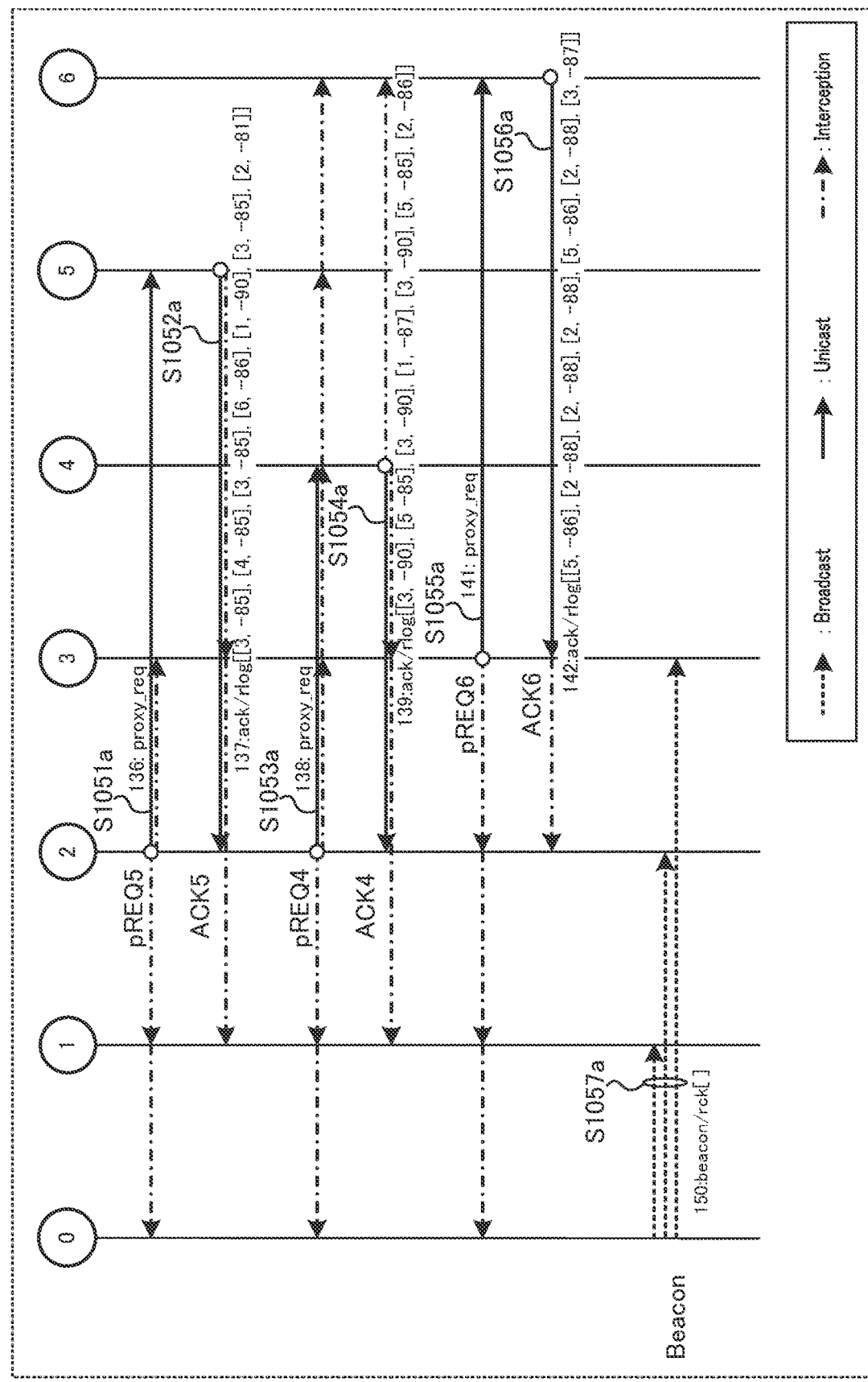
FIG. 19 is a sequence diagram illustrating an example of the proxy link quality collection process.

FIG. 19 is a sequence diagram illustrating an example of the proxy link quality collection process. The processes illustrated in FIG. 19 illustrate, for example, processes after the process of S1036c illustrated in FIG. 17. The processing of S1051a to S1057a illustrated in FIG. 19 is the same as the proxy link quality collection process illustrated in FIG. 14 (for example, the processing of S1051 to S1057). In radio network 100, parent node 0 identifies (or updates) the link qualities between radio nodes 10 in the radio network by repeating the proxy link quality collection process and the proxy link quality response process (see, for example, FIGS. 14, 17, and 19).

The example of each of the processes illustrated in FIG. 3 (for example, the processes of S102 to S106) has been described above. Radio node 10 may update the link quality log information on the link qualities between radio nodes 10 in radio network 100 by repeating the operation described above. Further, radio node 10 may reassign the relay node or select paths between radio nodes 10 based on the link quality log information.

State Transition of Radio Nodes 10

Figure 20:
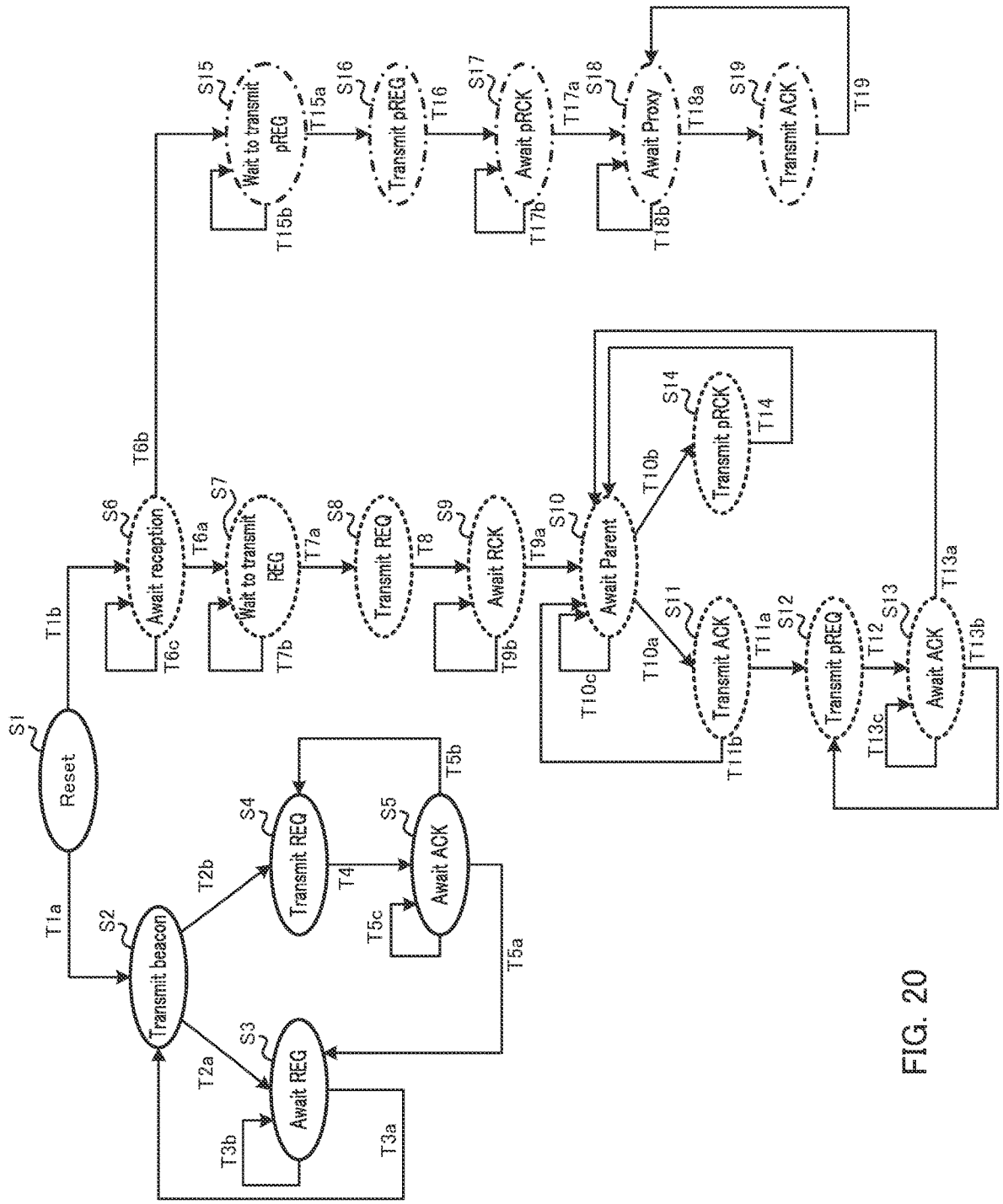
FIG. 20 illustrates an example of a state transition of radio nodes.

FIG. 20 illustrates an example of state transition of radio nodes 10. The state transition illustrated in FIG. 20 may be achieved by, for example, a program stored in storage 12 of radio node 10 (see, e.g., FIG. 2) and executed by controller 11.

In FIG. 20, "S" denotes a state and "T" denotes a transition.

For example, in FIG. 20, state transitions relevant to S1 to S5 represent state transitions of the parent node, state transitions relevant to S6 to S14 represent state transitions of the child node, and state transitions relevant to S15 to S19 represent state transitions of the grandchild node.

Further, radio node 10 may have a transition (not illustrated) for returning to reset state S1 in each state in FIG. 20 that is performed when detecting an abnormality or timeout.

State Transition of Parent Node

In reset state 51, radio node 10 determines whether or not radio node 10 is configured as the parent node. Radio node 10 transitions to beacon transmission state S2 (T1a) when configured as the parent node, and transitions to reception awaited state S6 (T1b) when not configured as the parent node.

In beacon transmission state S2, radio node 10 transmits a beacon packet. The beacon packet may include, for example, at least one of a type indicating a beacon (in other words, a packet type), an address of radio node 10, a destination address (e.g., a broadcast address), a beacon periodicity, reserved allocation slot information, address information on a connection permission node, and inter-node path information.

Radio node 10 transitions to REG awaited state S3 (T2a) when there is no connected child node, and transitions to REQ transmission state S4 (T2b) when there is a connected child node.

In REG awaited state S3, radio node 10 awaits to receive connection request information (REG) from another radio node 10. When radio node 10 receives the connection request information (REG) addressed to radio node 10 and connection is possible, radio node 10 adds, for example, the transmitter address of the transmitter of the connection request packet to the address information on the connection permission node. Further, when radio node 10 receives (in other words, intercepts) proxy connection permission information (pRCK) transmitted by a child node for radio node 10 and connection is possible, radio node 10 adds, for example, the destination address of the proxy connection permission information to the address information on the connection permission node.

When radio node 10 is the parent node, radio node 10 transitions to beacon transmission state S2 at a beacon transmission timing in accordance with the beacon periodicity (T3a), and stays in REG awaited state S3 except at the beacon transmission timing (T3b).

In REQ transmission state S4, radio node 10 transmits link quality request information (REQ) to a child node connected with radio node 10. Radio node 10 may sequentially transmit the link quality request information (REQ) to child nodes. Further, when the child node is a relay node for a grandchild node, radio node 10 may notify the child node of information (for example, reserved allocation slot information) indicating the timing at which the proxy link quality request information (pREQ) is transmitted. Radio node 10 transitions to ACK awaited state S5 (T4).

In ACK awaited state S5, radio node 10 awaits to receive the link quality response information (ACK) transmitted by the child node in response to the link quality request information (REQ) transmitted in REQ transmission state S4. For example, when receiving the link quality response information (ACK) from the child node, radio node 10 transitions to REQ transmission state S4 (T5b) when there is another child node, and transitions to REG awaited state S3 (T5a) when the link quality request information (REQ) has been transmitted to all the child nodes. Further, for example, radio node 10 stays in ACK awaited state S5 for a configured time (in other words, an allowable time) related to awaiting the link quality response information (T5c).

Radio node 10 combines the link quality log information (in other words, the link quality for the child node) and the proxy link quality log information (in other words, the link quality for the grandchild node) included in the link quality response information from the child node, and updates the link quality matrix.

State Transition of Child Node

In reception awaited state S6, radio node 10 awaits to receive a signal (in other words, a packet) transmitted by another radio node 10. In reception awaited state S6, radio node 10 is not in a connection state of being connected with the parent node. For example, when radio node 10 receives a beacon and judges to be connected with another radio node 10 (in other words, the parent node) being the transmitter of the beacon, radio node 10 transitions to REG transmission waiting state S7 (T6a). In addition, when radio node 10 receives (in other words, intercepts) the link quality response information (ACK) and judges to be connected with another radio node 10 (in other words, a child node) being the transmitter of the link quality response information, radio node 10 transitions to pREG transmission waiting state S15 (T6b). Further, when judging not to be connected with another radio node 10 corresponding to the parent node or the child node, radio node 10 stays, for example, in reception awaited state S6 (T6c).

In REG transmission waiting state S7, radio node 10 waits until the connection request information (REG) can be transmitted. In other words, radio node 10 stays in REG transmission waiting state S7 (T7b) until the connection request information (REG) can be transmitted. For example, radio node 10 may wait to perform transmission until completion of transmission of another radio node 10 sensed by carrier sensing or until elapse of a randomly configured back-off time. This waiting of transmission can suppress packet collisions between radio nodes 10. For example, radio node 10 transitions to REG transmission state S8 (T7a) at a timing at which the connection request information (REG) can be transmitted.

In REG transmission state S8, radio node 10 transmits the connection request information (REG) to the parent node that transmitted the beacon, and transitions to RCK awaited state S9 (T8).

In RCK awaited state S9, radio node 10 awaits to receive the connection permission information (RCK) from the parent node. For example, radio node 10 stays in RCK awaited state S9 until radio node 10 receives a beacon including the connection permission information (RCK) from the parent node (T9b). When the connection permission information (RCK) included in the beacon received from the parent node includes the address of radio node 10, radio node 10 judges that the connection with the parent node has been established, and transitions to Parent awaited state S10 (T9a). In other words, radio node 10 determines to have been configured as the child node for the parent node.

In Parent awaited state S10, radio node 10 (in other words, the child node) awaits to receive a signal (e.g., packet) from the parent node, for example.

For example, radio node 10 continues the connection state of being connected with the parent node when radio node 10 receives a beacon from the parent node. Radio node 10 stays in Parent awaited state S10 while radio node 10 is configured as the child node (T10c).

Further, radio node 10 may update the control information on radio network 100, such as, for example, the beacon periodicity and path information on paths between radio nodes 10. Further, when receiving the link quality request information (REQ) from the parent node, radio node 10 transitions to ACK transmission state S11 (T10a).

Further, when radio node 10 receives the proxy connection request information (pREG) from another radio node 10 and can be connected with the other radio node 10, radio node 10 transitions to pRCK transmission state S14 (T10b). Further, when receiving (in other words, intercepting) a signal from another child node (e.g., link quality response information (ACK)), radio node 10 may measure the link quality (e.g., RSSI) based on the signal to update the retained link quality log.

In ACK transmission state S11, radio node 10 transmits the link quality response information (ACK) to the parent node. In addition, radio node 10 may transmit the proxy link quality log information to the parent node, for example, when radio node 10 retains the proxy link quality log information on a grandchild node connected with radio node 10. In addition, when a reserved slot allocated for radio node 10 is present in the link quality request information (REQ) transmitted by the parent node, radio node 10 transitions to pREQ transmission state S12 (T11a) at the timing of the reserved slot. Radio node 10 transitions to Parent awaited state S10 during a time other than the timing of the reserved slot (T11b).

In pREQ transmission state S12, radio node 10 transmits the proxy link quality request information (pREQ) to the grandchild node connected with radio node 10 and transitions to ACK awaited state S13 (T12).

In ACK awaited state S13, radio node 10 awaits to receive the link quality response information (ACK) transmitted by the grandchild node in response to the proxy link quality request information (pREQ) transmitted in pREQ transmission state S12. For example, radio node 10 stays in ACK awaited state S13 for a configured time (in other words, an allowable time) related to awaiting the link quality response information (T13c). In ACK awaited state S13, radio node 10 receives the link quality response information (ACK) from the grandchild node. When other grandchild nodes exist, radio node 10 transitions to pREQ transmission state S12 (T13b) and receives the link quality response information (ACK) from the grandchild nodes. When the proxy link quality request information (pREQ) has been transmitted to all the grandchild nodes, radio node 10 transitions to Parent awaited state S10 (T13a).

For example, radio node 10 combines pieces of the proxy link quality log information (in other words, link qualities for the child nodes) included in the link quality response information from the grandchild nodes and updates the proxy link quality matrix.

In pRCK transmission state S14, radio node 10 transmits the proxy connection permission information (pRCK) to radio node 10 having transmitted the proxy connection request, and transitions to Parent awaited state S10 (T14).

State Transition of Grandchild Node

In pREG transmission waiting state S15, radio node 10 waits until the proxy connection request information (pREG) can be transmitted. In other words, radio node 10 stays in pREG transmission waiting state S15 until the proxy connection request information (pREG) can be transmitted (T15*b*). For example, radio node 10 may wait to perform transmission until completion of transmission of another radio node 10 sensed by carrier sensing or until elapse of a randomly configured back-off time. This waiting of transmission can suppress packet collisions between radio nodes 10. For example, radio node 10 transitions to pREG transmission state S16 (T15*a*) at a timing at which the proxy connection request information (pREG) can be transmitted.

In pREG transmission state S16, radio node 10 transmits the proxy connection request information (pREG) to the child node and transitions to pRCK awaited state S17 (T16).

In pRCK awaited state S17, radio node 10 awaits to receive the proxy connection permission information (pRCK) from the child node. For example, radio node 10 stays in pRCK awaited state S17 until radio node 10 receives a packet including the proxy connection permission information (pRCK) from the child node (T17*b*). When the address of radio node 10 is included in the proxy connection permission information (pRCK) included in the packet received from the child node, radio node 10 judges that the connection with the child node has been completed, and transitions to Proxy awaited state S18 (T17*a*). In other words, radio node 10 determines to have been configured as the grandchild node for the parent node.

In Proxy awaited state S18, radio node 10 (in other words, the grandchild node) awaits to receive a signal from the child node, for example.

For example, radio node 10 continues the connection state of being connected with the child node when radio node 10 receives a signal from the child node. Radio node 10 stays in Proxy awaited state S18 while radio node 10 is configured as the grandchild node (T18*b*).

Further, radio node 10 may update the control information on radio network 100, such as, for example, the beacon periodicity and path information on paths between radio nodes 10. Further, when receiving the proxy link quality request information (pREQ) from the child node, radio node 10 transitions to ACK transmission state S19 (T18*a*).

Note that, when receiving the proxy connection request information (pREG) from another radio node 10, radio node 10 may serve as the relay node to perform an operation related to proxy connection with the other radio node 10 when being capable of connecting with the other radio node 10.

In ACK transmission state S19, radio node 10 transmits the link quality response information (ACK) to the child node and transitions to Proxy awaited state S18 (T19).

One example of state transition of radio nodes 10 has been described above.

In the present embodiment, for example, radio node 10 transmits the proxy connection request to the child node upon receipt of a signal (for example, including the link quality response information) transmitted by the child node to the parent node in response to a request of the parent node (for example, including the link quality request information), and receives connection permission from the child node, thereby enabling communication with the parent node via the child node. In addition, radio node 10 that is the parent node detects the grandchild node by receiving the connection permission transmitted by the child node to the grandchild node in response to the proxy connection request.

With such a proxy connection process, upon receipt of, for example, a signal transmitted by each of a plurality of child nodes to the parent node, the grandchild node can dynamically determine a child node to be configured as the relay node. Therefore, according to the present embodiment, it is possible to efficiently determine radio node 10 (in other words, the communication path) involved in multi-hop transmission between a plurality of radio nodes 10.

Further, in the present embodiment, for example, the grandchild node begins the proxy connection request process by intercepting a signal addressed to another radio node (for example, the parent node) and connects with the child node. Further, the parent node detects a grandchild node (in other words, connection between a child node and the grandchild node) by intercepting a signal addressed to another radio node (for example, addressed to the grandchild node). Therefore, according to the present embodiment, it is possible to suppress an increase in control signals related to the proxy connection request process.

Further, in the present embodiment, the grandchild node measures the link quality between the child node and the grandchild node based on, for example, the reception level (e.g., RSSI) of a signal transmitted by the child node to the parent node, and determines, based on the measured link quality, a radio node (e.g., a relay node) to which the proxy connection request is to be transmitted. For example, based on the level at which the grandchild node receives the signal transmitted by each of a plurality of child nodes to the parent node, the grandchild node may determine, from among a plurality of child nodes, one child node to which the proxy connection request is to be transmitted. In other words, the communication path (in other words, the relay node) between those radio nodes 10 which do not directly communicate with each other is determined based on the link qualities between radio nodes 10.

By this determination of the communication path, a plurality of radio nodes 10 in radio network 100 can efficiently determine the communication path (for example, the relay node) according to a change in the link quality or the propagation environment in the actual radio environment. Efficient determination of the communication path can improve the transmission efficiency in radio network 100.

The exemplary embodiment of the present disclosure has been described above.

Note that, one exemplary embodiment of the present disclosure has been described in relation to the relay (or forwarding) of a message between three radio nodes 10 of the parent node, the child node, and the grandchild node, but the present disclosure is not limited to this. For example, an exemplary embodiment of the present disclosure may be applied to a relay (or forwarding) of a message between four or more radio nodes 10. In this case, for example, as in the operation of the child node described above, the grandchild node may further be configured as a relay node for collecting the link quality of the other radio nodes by proxy.

In addition, one exemplary embodiment of the present disclosure has been described, for example, as illustrated in FIG. 1A, in relation to a case in which a certain radio node 10 (radio node 0 in FIG. 1A as an example) and other radio nodes 4 to 6 located outside communication area 101 of radio node 0 do not directly communicate with each other. However, the environment in which direct communication is not performed is not limited to this case. For example, in FIG. 1A, a case may be probable in which any of radio nodes 1 to 3 located within communication area 101 of radio node 0 does not directly communicate with radio node 0. For example, a case may be probable in which existence of a blocking object between radio node 0 and any of radio nodes 1 to 3 causes the radio nodes not to communicate with each other.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input and an output. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

In the above descriptions, the expression "section" used for the components may be replaced with another expression such as "circuit (circuitry)," "device," "unit," or "module."

Summary of Embodiment

A radio communication system according to an exemplary embodiment of the present disclosure includes: a first radio node; one or more second radio nodes that are connected with the first radio node and that transmit a signal to the first radio node; and a third radio node that transmits a connection request to the one or more second radio nodes when receiving the signal addressed to the first radio node, in which, when the one or more second radio nodes receives the connection request, the one or more second radio nodes transmit connection permission to the third radio node, the connection permission indicating that the one or more second radio nodes function as a relay node between the first radio node and the third radio node.

In an exemplary embodiment of the present disclosure, the signal transmitted by the one or more second radio nodes to the first radio node includes information on received quality measured by the one or more second radio nodes.

In an exemplary embodiment of the present disclosure, the one or more second radio nodes transmit, to the third radio node, a request for information on received quality measured by the third radio node, the third radio node transmits the information on the received quality measured by the third radio node to the one or more second radio nodes in response to the request for the information, and the one or more second radio nodes transmit, to the first radio node, a signal including the information on the received quality measured by the third radio node.

In an exemplary embodiment of the present disclosure, the one or more second radio nodes include a plurality of second radio nodes, and, based on a level at which the third radio node receives the signal transmitted by each of the plurality of second radio nodes to the first radio node, the third radio node determines, from among the plurality of second radio nodes, one second radio node to which the connection request is transmitted.

In an exemplary embodiment of the present disclosure, the third radio node is located outside a range in which it is possible for the first radio node to communicate and is located within a range in which it is possible for the one or more second radio nodes to communicate.

A radio communication apparatus according to an exemplary embodiment of the present disclosure includes: reception circuitry, which, in operation, receives a signal transmitted to a first radio node by a second radio node; and transmission circuitry, which, in operation, transmits a connection request to the second radio node when the reception circuitry receives the signal transmitted to the first radio node, in which the reception circuitry receives connection permission from the second radio node in response to the connection request, the connection permission indicating that the second radio node functions as a relay node between the radio communication apparatus and the first radio node.

A radio communication control method according to an exemplary embodiment of the present disclosure is a radio communication control method for a radio communication system including a first radio node, a second radio node, and a third radio node, the radio communication control method comprising: transmitting, by the second radio node, a signal to the first radio node in response to a request of the first radio node connected with the second radio node; transmitting, by the third radio node, a connection request to the second radio node when the third radio node receives the signal addressed to the first radio node; and transmitting, by the second radio node, connection permission to the third radio node when the second radio node receives the connection request, the connection permission indicating that the second radio node functions as a relay node between the first radio node and the third radio node.

The disclosure of Japanese Patent Application No. 2019-144493 dated Aug. 6, 2019 including the specification, drawings and abstract is incorporated herein by reference in its entirety.

INDUSTRIAL APPLICABILITY

One aspect of the present disclosure is applicable to radio communication systems.

REFERENCE SIGNS LIST

10 Radio node
11 Controller
12 Storage
13 Wired communication section
14 Radio communication section
15 Link quality measurer
16 Sensor
17 Actuator

The invention claimed is:

1. A radio communication system, comprising:
a first radio node;
one or more second radio nodes that are connected with the first radio node and that transmit a signal addressed to the first radio node, the signal addressed to the first radio node including link quality information measured by the one or more second radio nodes; and
a third radio node that
intercepts the signal addressed to the first radio node, determines, in response to intercepting the signal addressed to the first radio node, a second radio node of the one or more second radio nodes based on a reception power of the intercepted signal addressed to the first radio node, the second radio node being a transmitter of the intercepted signal which has a highest reception power among intercepted signals, and
transmits a connection request to the determined second radio node,
wherein, in response to the determined second radio node receiving the connection request, the determined second radio node transmits a connection permission to the third radio node, the connection permission indicating that the determined second radio node functions as a relay node between the first radio node and the third radio node,
wherein the third radio node is located outside a range in which it is possible for the first radio node to directly communicate and is located within a range in which it is possible for the one or more second radio nodes to directly communicate.

2. The radio communication system according to claim 1, wherein
the one or more second radio nodes transmit, to the third radio node, a request for information on received quality measured by the third radio node,
the third radio node transmits the information on the received quality measured by the third radio node to the one or more second radio nodes in response to the request for the information, and
the one or more second radio nodes transmit, to the first radio node, a signal including the information on the received quality measured by the third radio node.

3. A radio communication apparatus, comprising:
reception circuitry, which, in operation, intercepts a signal addressed to a first radio node and transmitted by one or more second radio nodes, the signal addressed to the first radio node including link quality information measured by the one or more second radio nodes;
processing circuitry, which, in operation, determines, in response to the interception of the signal addressed to the first radio node, a second radio node of the one or more second radio nodes based on a reception power of the intercepted signal addressed to the first radio node, the second radio node being a transmitter of the intercepted signal which has a highest reception power among intercepted signals; and
transmission circuitry, which, in operation, transmits a connection request to the determined second radio node,
wherein the reception circuitry receives connection permission from the determined second radio node in response to the connection request, the connection permission indicating that the determined second radio node functions as a relay node between the radio communication apparatus and the first radio node,
wherein the radio communication apparatus is located outside a range in which it is possible for the first radio node to directly communicate and is located within a range in which it is possible for the one or more second radio nodes to directly communicate.

4. A radio communication control method for a radio communication system including a first radio node, one or more second radio nodes, and a third radio node, the radio communication control method comprising:

transmitting, by the second radio node, a signal addressed to the first radio node in response to a request of the first radio node connected with the second radio node, the signal addressed to the first radio node including link quality information measured by the one or more second radio nodes;

intercepting, by the third radio node, the signal addressed to the first radio node;

determining, by the third radio node and in response to the third radio node intercepting the signal addressed to the first radio node, a second radio node of the one or more second radio nodes based on a reception power of the intercepted signal addressed to the first radio node, the second radio node being a transmitter of the intercepted signal which has a highest reception power among intercepted signals;

transmitting, by the third radio node, a connection request to the determined second radio node; and transmitting, by the determined second radio node and in response to the determined second radio node receiving the connection request, connection permission to the third radio node, the connection permission indicating that the determined second radio node functions as a relay node between the first radio node and the third radio node, wherein the third radio node is located outside a range in which it is possible for the first radio node to directly communicate and is located within a range in which it is possible for the one or more second radio nodes to directly communicate.

* * * * *